(12) United States Patent
Jain

(10) Patent No.: US 10,036,828 B2
(45) Date of Patent: Jul. 31, 2018

(54) SYSTEM AND METHOD FOR MAKING DOWNHOLE MEASUREMENTS

(71) Applicant: SHELL OIL COMPANY, Houston, TX (US)

(72) Inventor: Praveen Jain, Bergen (NO)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/109,340

(22) PCT Filed: Dec. 19, 2014

(86) PCT No.: PCT/EP2014/078705
§ 371 (c)(1),
(2) Date: Jun. 30, 2016

(87) PCT Pub. No.: WO2015/101520
PCT Pub. Date: Jul. 9, 2015

(65) Prior Publication Data
US 2016/0327680 A1  Nov. 10, 2016

(30) Foreign Application Priority Data

Jan. 2, 2014  (EP) ..................... 14150038

(51) Int. Cl.
*G01V 5/10* (2006.01)
*E21B 45/00* (2006.01)

(52) U.S. Cl.
CPC .............. *G01V 5/101* (2013.01); *E21B 45/00* (2013.01)

(58) Field of Classification Search
CPC .................. G01V 5/101; E21B 45/00
See application file for complete search history.

(56) References Cited

U.S. PATENT DOCUMENTS

| | | | |
|---|---|---|---|
| 4,475,386 A | 10/1984 | Fitch et al. | |
| 4,503,328 A * | 3/1985 | Neufeld | G01V 5/08 250/262 |
| 5,107,705 A * | 4/1992 | Wraight | E21B 19/20 348/85 |
| 5,341,886 A | 8/1994 | Patton | |
| 5,404,752 A * | 4/1995 | Chace | E21B 47/1015 250/268 |

(Continued)

FOREIGN PATENT DOCUMENTS

EP   2615477   7/2013
WO   2006004740   1/2006

*Primary Examiner* — David Porta
*Assistant Examiner* — Djura Malevic

(57) ABSTRACT

A system and method for making downhole measurements utilize a neutron source (12) to create a marker (122) in an underground formation (2), a nuclear radiation detector (D, 124)) to detect gamma and/or other nuclear radiation emitted by the marker (122) and a downhole drilling progress monitoring unit (20) which generates real time information about incremental depth and/or associated Rate Of Penetration (ROP) of an automated or other drilling assembly (4) based on detection of the nuclear radiation and an axial distance L between the neutron source (120) and the nuclear radiation detector (D, 124) without requiring transmission of the real time incremental depth and/or ROP data to surface equipment via a complex wired or wireless data transmission system.

15 Claims, 10 Drawing Sheets

(56) References Cited

U.S. PATENT DOCUMENTS

| | | | | |
|---|---|---|---|---|
| 5,461,909 A * | 10/1995 | Arnold | ............... | E21B 47/1015 250/255 |
| 5,585,726 A | 12/1996 | Chau | | |
| 5,699,246 A * | 12/1997 | Plasek | ................... | E21B 47/00 175/50 |
| 5,896,939 A | 4/1999 | Witte | | |
| 6,023,443 A * | 2/2000 | Dubinsky | ............... | E21B 43/08 175/45 |
| 6,678,616 B1 * | 1/2004 | Winkler | ................. | G01V 1/44 181/104 |
| 6,769,497 B2 * | 8/2004 | Dubinsky | ............. | E21B 44/005 175/27 |
| 6,885,942 B2 * | 4/2005 | Shray | .................. | G01V 11/00 702/11 |
| 7,142,985 B2 * | 11/2006 | Edwards | ................. | G01V 9/00 702/6 |
| 7,227,129 B2 * | 6/2007 | Riley | .................... | E21B 43/126 250/269.6 |
| 7,253,401 B2 * | 8/2007 | Mickael | ............. | G01V 5/06 250/252.1 |
| 7,283,910 B2 * | 10/2007 | Hassan | .................. | E21B 47/00 175/61 |
| 7,688,306 B2 * | 3/2010 | Wehrenberg | ......... | G06F 1/1616 345/156 |
| 7,770,663 B2 * | 8/2010 | Mathiszik | ............. | E21B 47/026 175/40 |
| 7,804,060 B2 * | 9/2010 | Guo | ....................... | G01V 5/104 166/254.2 |
| 7,999,220 B2 | 8/2011 | Odom | | |
| 8,113,041 B2 | 2/2012 | Difoggio et al. | | |
| 8,122,954 B2 * | 2/2012 | Estes | ...................... | E21B 47/04 166/255.1 |
| 8,528,637 B2 * | 9/2013 | Cresswell | ............... | E21B 47/04 166/255.1 |
| 9,027,670 B2 * | 5/2015 | Sugiura | ..................... | E21B 7/04 175/24 |
| 9,238,958 B2 * | 1/2016 | Teodorescu | ............ | E21B 45/00 |
| 9,261,622 B2 * | 2/2016 | Inanc | ..................... | G01V 5/101 |
| 2002/0195276 A1 * | 12/2002 | Dubinsky | ............. | E21B 44/005 175/40 |
| 2002/0195423 A1 | 12/2002 | Patel et al. | | |
| 2003/0101011 A1 * | 5/2003 | Odom | ..................... | G01N 9/24 702/78 |
| 2006/0015257 A1 | 1/2006 | Hassan et al. | | |
| 2008/0105423 A1 | 5/2008 | Estes et al. | | |
| 2008/0251710 A1 | 10/2008 | Riley et al. | | |
| 2009/0084546 A1 | 4/2009 | Ekseth et al. | | |
| 2009/0166031 A1 * | 7/2009 | Hernandez | ............. | E21B 21/08 166/250.01 |
| 2010/0004867 A1 | 1/2010 | Zhou et al. | | |
| 2012/0043966 A1 * | 2/2012 | Montaron | ............... | G01V 5/104 324/324 |
| 2013/0008646 A1 | 1/2013 | Blount | | |

* cited by examiner

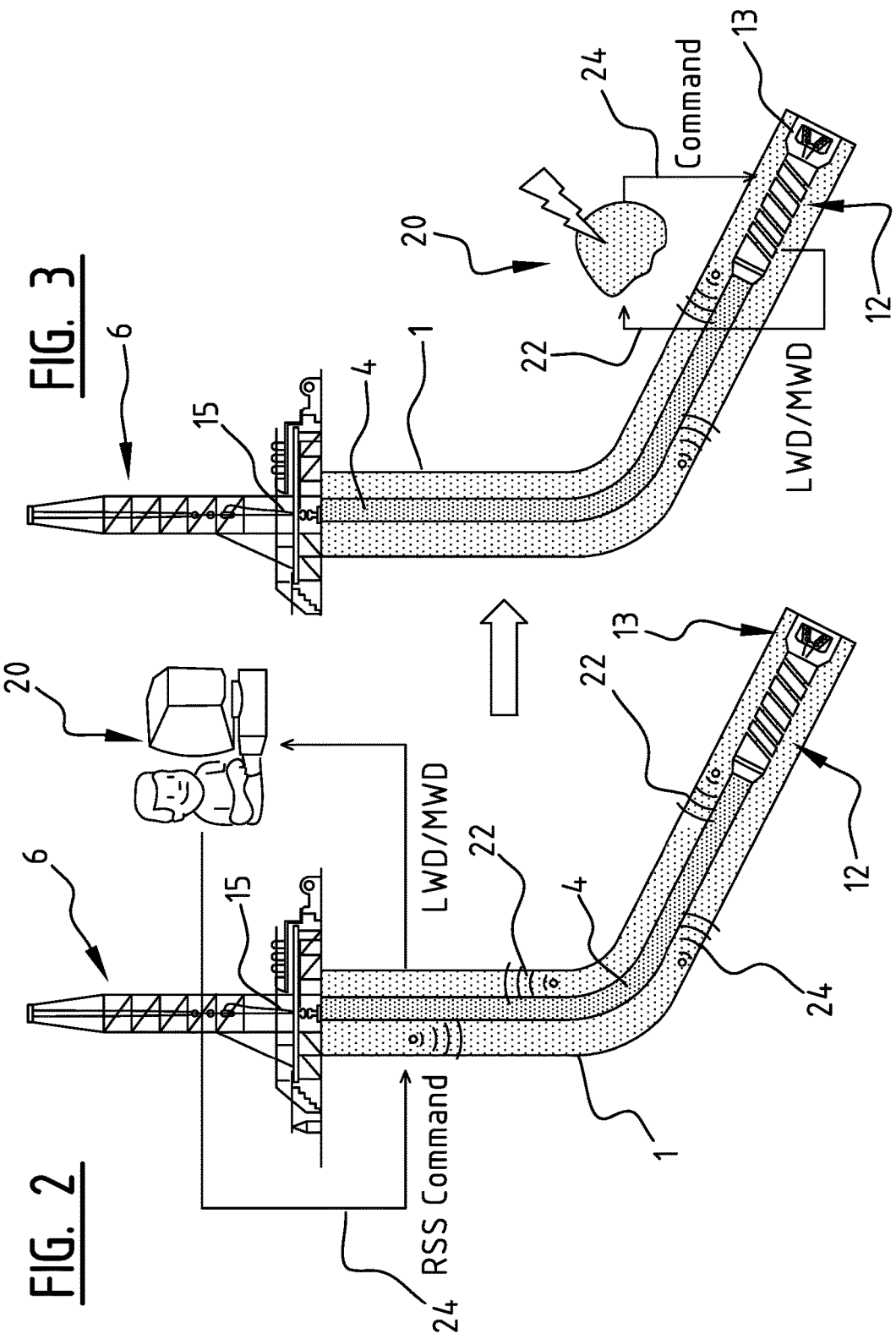

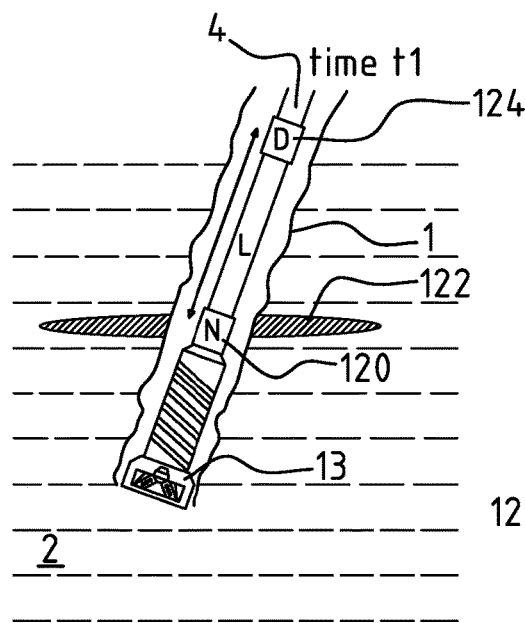
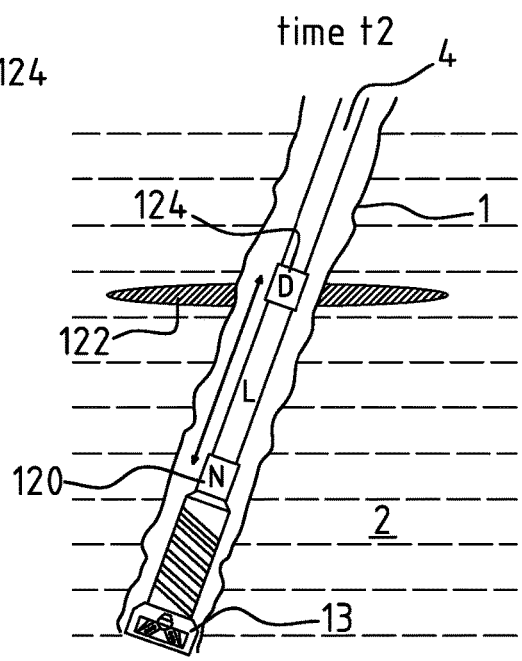
FIG. 9A
FIG. 9B
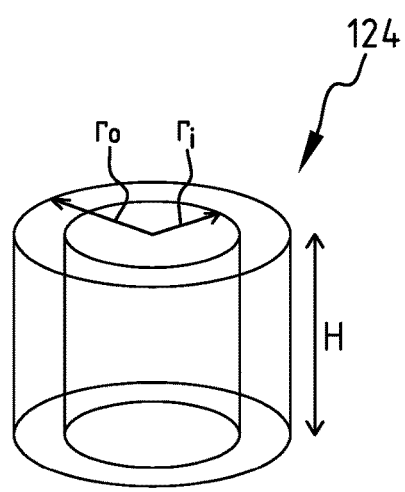
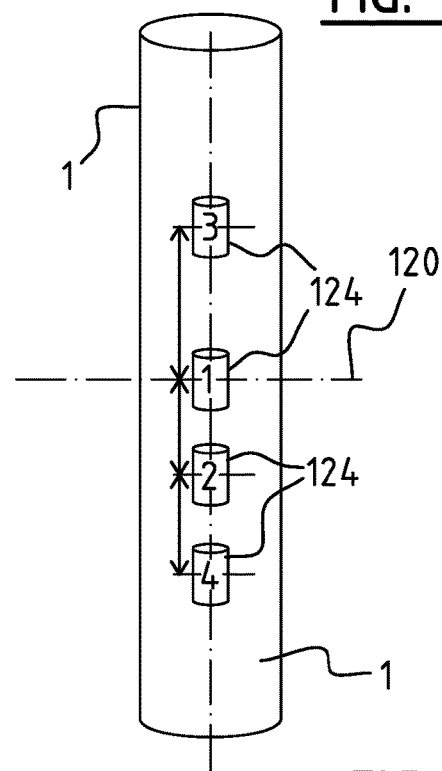
FIG. 10A
FIG. 10B

SYSTEM AND METHOD FOR MAKING DOWNHOLE MEASUREMENTS

BACKGROUND OF THE INVENTION

The invention relates to a system and method for making downhole measurements in an underground borehole. The borehole may be related to the exploration or production of hydrocarbon fluids, such as crude oil and/or natural gas.

Boreholes for the production of crude oil and/or natural gas from a subsurface formation are generally drilled using a rotatable drill string. The drill string typically comprises a series of interconnected drill pipe sections. A downhole end of the drill string may typically be provided with a Bottom Hole Assembly (BHA) including sections of heavier drill collar to provide weight on bit, measuring while drilling (MWD) equipment, and a drill bit at the downhole end thereof for crushing the formation. A drilling rig at surface for holding the drill string is provided with a drive system for rotating the drill string, typically including a top drive or other rotary table.

One of the key hurdles in achieving real time subsurface navigation lies in a communication bottleneck between surface and downhole. Currently available measurement while drilling tools and logging while drilling tools can measure all vital information downhole, except depth. Real time availability of a depth estimate downhole can open new possibilities for real time automated bit steering and optimization in well drilling operations.

For the navigation in subsurface, one of the most important measurement is borehole depth at any point in time. Along with directional measurements of azimuth and inclination it gives the location of the drill bit with respect to a surface location. There are several uses of the depth measurement, such as in locating geological features in the formation, in following an optimized borehole trajectory, for the calculation of casing shoe depth, for estimating cement quantities, etc.

In current system of depth measurement, a surface system may record the time and length of the drill string below the rig floor. The drill string length may be used as standard depth measurement. The Kelly bushing or rig floor may be used as reference for land based rigs and mean sea level for offshore rigs. The length of the drill string (combined lengths of the BHA and the drill pipe sections) to the top drive (or traveling block) and the position of the top drive (or traveling block) in the derrick is used to determine the depth of the drill bit and the rate of penetration (ROP).

The movement of the traveling block is measured by drilling line payout from the draw works, which is either calibrated with draw work rotation or measured with help of a geolograph. Offshore, a heave compensator may be used to eliminate effects of heave in floating offshore facilities. Despite all the efforts to make an accurate measurement of depth, current systems are prone to errors due to factors related to thermal expansion, drill pipe stretch, pressure effects, and/or an error in pipe tally, drill string sensor calibration and heave correction. The total error in depth due to these factors can be up to 10-12 m over 3000 m depth. There have been efforts to calculate the error related to the above mentioned phenomena and use this as a correction to determine correct depth but they do not quantify the error accurately and are seldom used in practice. Downhole measurement of depth has a potential to eliminate these errors.

U.S. Pat. No. 5,341,886 discloses a method and apparatus for controlling the direction of advance of a rotary drill. The system comprises a drill string, a rotatable drill bit carried on the drill string, a roratable bit, and a compliant subassembly facilitating changes in the direction of drilling. The system includes a magnetic marker assembly, comprising a formation magnetizer. Magnetic markers in the formation are created by corresponding current pulses through the magnetizer. The tool also includes magnetic sensors, spaced a distance L from the magnetizer. When the magnetic sensors detect a magnetic marker, the magnetizer is urged to create another magnetic marker. New magnetic markers are created each spaced a distance L apart, allowing measurement of incremental depth.

In practice, the system of U.S. Pat. No. 5,341,886 proves to have drawbacks rendering it unsuitable for application. The formation often cannot be magnetized, creating significant errors in the depth measurement. The disclosure of U.S. Pat. No. 5,341,886 indicates the necessity to use high intensity magnetic pulses, in the order of a few thousand oersteds at the pole faces. In addition to significant power requirements, the high intensity magnetic pulses may interfere with magnetisable materials in the tool string.

U.S. Pat. No. 7,283,910 discloses a method and apparatus for logging an earth formation and acquiring subsurface information to obtain parameters of interest, which may include density, porosity, acoustic reflectance, a nuclear magnetic resonance property, or electrical resistivity. The parameters are acquired with a plurality of sensors. Time separation values between signals from separate sensors are determined. Using known sensor spatial separations and time separation values, a drill rate is determined and an incremental depth for the subsurface feature is defined.

The apparatus of U.S. Pat. No. 7,283,910 emits nuclear energy, and more particularly gamma rays. A gamma ray source is combined with two or more gamma ray detectors, shielded from the source. During operation of the probe, gamma rays (or photons) emitted from the source enter the formation and interact with the atomic electrons of the material of the formation by photoelectric absorption, by Compton scattering, or by pair production. The sensor may include a nuclear magnetic resonance sensor.

While drilling, the two or more sensors pass the same location in the formation at a different time, depending on their separation and the rate of penetration. An algorithm can be used to compare the outputs from these sensors in time to correlate the character of the signals which come from the same subsurface formation. As these signals correspond to the same subsurface location, the progress along the borehole as well as the rate of penetration can be calculated, using the known distance L between the sensors. I.e., the drill string has progressed a distance L along the borehole during the time difference $\Delta t=(t2-t1)$. The rate of penetration $ROP=L/(t2-t1)$. By integrating the ROP, incremental depth can be calculated.

The apparatus of U.S. Pat. No. 7,283,910 has a few challenges. For instance, in horizontal sections, wherein the borehole typically extends within a formation layer and in the same lithology, the characteristic rock property signature might not change significantly enough to distinguish between the signature and noise. In addition, logs never repeat exactly. The minor variations in successive gamma ray measurements are usually statistical fluctuations due to the random nature of the radioactive pulses reaching the detector or sensor. For example, the accuracy of gamma ray tools is around 5% in general and precision is inversely proportional to the square root of the logging speed and will be affected by a change in instantaneous speed. Fluid invasion and change in hole diameter, for instance due to washouts, can also change the measured values over time. With the integration of ROP, an integration error is introduced in the calculated incremental depth, which error will increase with increasing depth. The size of the error depends, for instance, on ROP variation, distance between the sensors and frequency of measurements. Finally, the precision of logging tools decreases with increasing temperature, which limits high temperature application.

U.S. Pat. No. 7,999,220 discloses an assembly of a pulsed neutron source and a gamma ray detector for borehole logging. The detector assembly comprises a lanthanum bromide (LaBr3) scintillation crystal and a digital spectrometer that cooperates with the crystal and a digital spectrometer that cooperates with the crystal to maximize pulse processing throughput. The assembly is applicable to borehole logging methodology that uses the measure of gamma radiation in harsch horehole conditions. The system is particularly applicable to carbon/oxygen logging.

European patent application EP 2615477 discloses a neutron logging tool for measuring azimuthal distribution of proppant in formation fractures. The tool has a neutron source and multiple detectors spaced about the circumference of the tool. The detectors are shielded from each other such that each detector detects gamma rays from the area of the borehole and formation to which it is closest. To capture a log with the tool, the neutron source sends high energy neutrons into the surrounding formation. The neutrons quickly lose energy as the result of scattering, after which they are absorbed by the various atoms within the ambient environment. The scattered and absorbed neutrons emit gamma rays with characteristic energies. These gamma rays can be measured versus characteristic energy and the presence or absence of certain materials can be determined.

International patent application WO 2006/004740 discloses a downhole pulsed neutron emission and detection technique for determination of fluid flow velocity in a borehole.

US patent application US 2008/251710 discloses a wireline suspended borehole logging tool for determining silicon content of a formation equipped with a pulsed neutron emission source and nuclear radiation sensors and a processor located at the earth that may be configured to estimate the velocity of the logging tool based on the measurements made by the sensors transmitted to the surface processor via the wireline from which the logging tool is suspended. It would not be obvious for a skilled drilling expert who wished to estimate depth of a borehole being drilled to find a solution to this problem to consult US 2008/251710 relating to a wireline logging tool for determining silicon content in a formation. US 2008/251710 neither teaches that instead of transmitting tool velocity measurements made by downhole neutron emission source and nuclear radiation sensors to a processor at the earth surface these velocity measurements may be transmitted to a downhole tool, thereby obviating the need to transmit a large amount of data to a processor at the earth surface via a data transmission wireline, which is not practical or expensive to insert into a rotary drilling assembly.

Prior art documents provide wireline operated or relatively inaccurate borehole depth measurement tools. None thereof however can measure depth without requiring data transmission via a wireline to a surface processor and/or with an accuracy which would be sufficient for automated drilling.

Therefore there is a need to improve upon one or more of the systems and methods as described above.

Furthermore there is a need for an accurate downhole drilling progress monitoring unit, which can provide accurate real-time incremental depth of an automated or other drilling assembly during drilling without requiring complex and fragile wired or wireless data transmission equipment extending from a Bottom Hole Assembly (BHA) of the drilling assembly to the earth surface.

SUMMARY OF THE INVENTION

In accordance with the invention there is provided a system for making downhole measurements in an underground borehole, the system comprising:
 a neutron source for transmitting a neutron pulse to activate a target substance in an underground formation surrounding the borehole;
 a nuclear radiation detector located at an axial distance L from the neutron source for detecting nuclear radiation emitted by the activated target substance; and
 a downhole drilling progress monitoring unit configured to calculate incremental depth of a drilling assembly in the borehole based on detection of the nuclear radiation and the axial distance L.

The downhole drilling progress monitoring unit may be arranged in a Bottom Hole Assembly (BHA) of a drilling assembly and be configured to provide real time data regarding the incremental depth, an associated Rate Of Penetration (ROP), azimuth and/or inclination of the BHA to an automated drill bit navigation system in the BHA and the drilling progress monitoring unit may be configured to transmit the real time data to the automated drill bit navigation system via a signal transmission assembly in the BHA without requiring transmission of the real time data to data processing equipment located at the earth surface.

The downhole automated drill bit navigation system may further comprise means for navigating the BHA towards a subsurface drilling target based on data stored in the system regarding:
 three-dimensional geographic coordinates of a wellhead of the borehole and of the subsurface drilling target; and
 an estimate of the borehole trajectory based on the real time data collected by the drilling progress monitoring unit regarding the incremental depth, azimuth and inclination of the BHA throughout the length of the borehole trajectory.

Optionally, at least one detector may be cylindrical, have a height of at least 5 cm and/or be configured to detect nuclear radiation emitted by a target substance comprising Chlorine-37, Sodium-23 and/or Silicon-30 and the axial distance L between the neutron source and nuclear radiation detector (D) may be equal to or smaller than a maximum value $L_{max}$, wherein the axial distance L is larger than a spread of activated nuclei of the target substance along the axis of the borehole and/or $L_{max}$ is between 3 and 6 meters and/or the axial distance L is at least 20 cm.

In accordance with the invention there is furthermore provided a method of making downhole measurements in an underground borehole, the method comprising the steps of:
 transmitting a neutron pulse by a neutron source to activate a target substance in an underground formation surrounding the borehole;
 inducing a nuclear radiation detector located at an axial distance L from the neutron source to detect nuclear radiation emitted by the activated target substance; and inducing a downhole drilling progress monitoring unit to calculates incremental depth of a drilling assembly in the borehole based on detection of the nuclear radiation and the axial distance L.

The downhole drilling progress monitoring unit may be arranged in a Bottom Hole Assembly (BHA) of the drilling assembly and provide real time information about the incremental depth, an associated Rate Of Penetration (ROP), azimuth and/or inclination of the BHA to an automated drill bit navigation system in the BHA via a signal transmission assembly in the BHA without requiring transmission of the real time data to data processing equipment located at the earth surface via complex, fragile and expensive wireless or wired data transmission system extending between the BHA and surface drilling navigation and control equipment.

The automated downhole drill bit navigation system may comprise means for navigating the BHA towards a subsurface drilling target based on data stored in the system regarding:
- three-dimensional geographic coordinates of a wellhead of the borehole and of the subsurface drilling target; and
- an estimate of the borehole trajectory based on the real time data collected by the drilling progress monitoring unit regarding the incremental depth, azimuth and inclination of the BHA throughout the length of the borehole trajectory and the automated drilling process may be terminated when the BHA has reached or nearly reached the subsurface drilling target, whereupon the drilling assembly may be removed from the borehole, the borehole may be completed and converted into a hydrocarbon fluid production well from which hydrocarbon fluid may be produced.

BRIEF DESCRIPTION OF THE DRAWINGS

The invention will be described hereinafter in more detail and by way of example with reference to the accompanying drawings, in which:

FIG. 2 shows a cross section of a conventional directional drilling system;

FIG. 3 shows a cross-section of an embodiment of a directional drilling system of the invention;

FIGS. 9A and 9B show cross sections of an embodiment of the system of the invention, at times t1 and t2 respectively;

FIG. 10 shows a perspective view of en embodiment of the system of the invention;

DETAILED DESCRIPTION OF DEPICTED EMBODIMENTS

Figure 1:
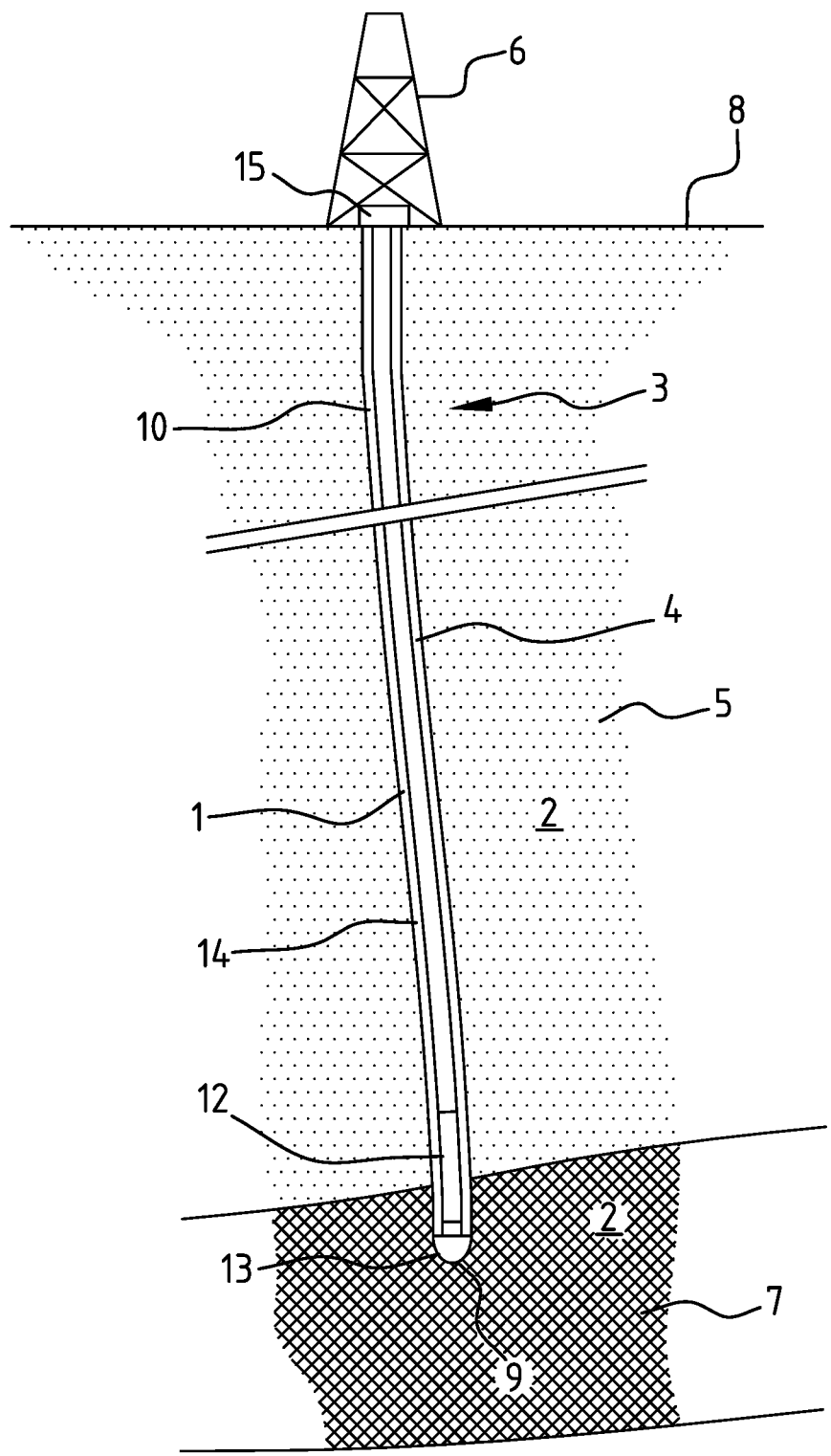
FIG. 1 shows a cross section of a borehole including an embodiment of a drilling system.

In the description and the accompanying figures, like reference numerals relate to like components. Depicted components and described features may be combined in several ways.

FIG. 1 shows a borehole 1 extending into an underground earth formation 2, which typically comprises a number of layers 5, 7, each having distinct characteristics. The layer 7 may for instance be a reservoir layer, comprising hydrocarbon fluids, such as crude oil and/or natural gas. A drilling assembly 3 for drilling the borehole 1 typically comprises a tubular drill string 4 extending from a drilling rig 6 at surface 8 to a downhole end 9 of the borehole 1. The drill string 4 may have a first or upper section 10 formed of sections of drill pipe. A second or downhole section of the drill string may be referred to as the Bottom Hole Assembly or BHA 12. The downhole end of the BHA 12 is provided with a drill bit 13. An annulus 14 extends between the drill string 4 and the wall of the wellbore 1. The drilling rig 6 is typically provided with a rotary drive system 15 for rotating the drill string about a longitudinal axis thereof.

The Bottom Hole Assembly or BHA 12 may also include additional equipment, such as drill collars and drill string stabilizers. The drill collars may include heavier pipe sections to provide weight on bit.

During drilling, the rotary drive system 15 is operated to rotate the drill string 4 in the wellbore 1. Drilling fluid may be pumped from surface via an interior fluid passage of the drill string 4 to the drill bit 13, which expels the drilling fluid. A return flow of drilling fluid flows upwardly through the annular space 14 to surface, taking along drill cuttings resulting from the cutting action of the drill bit 13.

One of the emerging areas of interest in the hydrocarbon industry is the development of thin and/or tight reservoirs. These reservoirs require a greater reservoir contact area than conventional hydrocarbon reservoir layers. Options to increase the reservoir contact area include the drilling of relatively long horizontal sections and/or the drilling of multiple side tracks to create root-like multi-lateral wellbores.

Most of these state of the art drilling applications use real time formation evaluation techniques and sophisticated downhole tools to find the geological target zone and maintain contact with the reservoir, e.g. for several kilometers, while drilling ahead. Changing the wellbore trajectory while drilling to achieve greater contact with the geological target zone or to avoid risk zones is called geosteering. Geosteering may result in a complex three dimensional wellbore geometry.

Geosteering systems may comprise complex electro-mechanical systems which are relatively expensive to build and maintain. This cost factor limits their use and may render their use uneconomical.

Another limitation of current geosteering technology is its dependency on human expertise in interpretation of subsurface data and drilling parameters for real time decision making. Constant reliance on human judgement leaves room for error and inconsistency and increases risk exposure.

An improvement over current system can be achieved in simpler tool construction and automation of the process for lower cost and consistent performance.

To realise the concept of automated subsurface navigation, one of the primary decisions is to decide on the location of the control unit 20, or the brain, of the system. The control unit 20 will take input from all possible measurements and processes it with acquired intelligence for real time decision making. If the control unit of the system is situated at the earth surface, all downhole measurements 22 must be sent to surface, while decisions 24 in terms of tool settings must be sent downhole as illustrated in FIG. 2.

One of the key challenges in the development of surface based automation lies in the capacity bottleneck of current communication systems. Current state of the art technology for communication between bottom hole and surface is mud-pulse telemetry which suffers from decrease in data carrying capacity with increase in the depth of the hole due to higher attenuation of high frequency signals. Commercial systems claim data rates of about 40 bits/s for shallow wells, decreasing to 3 bits/s for extended reach wells with an additional overhead of disruption in operations for downlinking. There is also a time lag between subsurface measurement and surface reproduction of information which along with limited data transfer rates severely limit the capability of the control system to achieve real time closed loop control of the bit and the wellbore trajectory and reap full benefits of high frequency, high resolution data acquisition downhole.

Another option is to arrange the 'Brain' 20, i.e. the control unit, nearer to the bit 13 as illustrated in FIG. 3. Downhole, measurements relating to formation evaluation (such as gamma ray, resistivity, density, sonic velocity logs, etc.) may be readily available, and may be used as a basis for geosteering decisions. Locating the control unit 20 downhole will greatly reduce the bandwidth requirement for data transmission to and from surface. Located downhole, the control unit may utilize high resolution datasets in real time, substantially eliminating time lag issues and data compression requirements, which will enhance accuracy and quality of the decisions.

It is possible to acquire all the vital drilling parameters such as weight on bit, bit rotations per minute (RPM), drilling fluid flow rate, temperature, pressure etc., using measurement while drilling (MWD) systems included in the bottom hole assembly 12. The MWD systems enable improved monitoring and optimization.

But not all parameters are measured subsurface yet. In practice, the depth of the drill bit is currently still measured at surface and will need to be transmitted to the BHA. Downhole measurement of depth can eliminate this need of depth data transmission from surface to the BHA and enhance the real time capabilities and accuracy of an automated subsurface navigation system.

Though downhole depth estimation has been researched in the past for its potential to eliminate errors of surface based depth measurement, there is no system commercially available at present. Many ideas have been proposed in various patents and publications, for instance using a mechanical wheel (U.S. Pat. No. 5,341,886), pipe tally (U.S. Pat. No. 5,896,939, US-2008/0105423), a magnetic marker-detector system (U.S. Pat. No. 5,341,886), correlation of geological markers (U.S. Pat. No. 7,283,910).

Of the above options, the use of pipe tally is the least complicated to implement. However, the accuracy of the depth estimate is often worse than the surface based measurement. The depth estimates available from the system are relatively coarse and inaccurate (spaced by pipe joint length) and therefore unsuitable for a real time automation application.

Proposals for depth measurement systems based on pressure or gravity measurements (U.S. Pat. No. 4,475,386, U.S. Pat. No. 8,113,041) can only give estimates of vertical depth and need robust gravity or pressure models as well as highly accurate measurements in the downhole environment.

A few authors have proposed the use of accelerometer (US-2008/0105423, US-2009/0084546, US-2002/0195276, U.S. Pat. No. 5,585,726) similar to inertial navigation systems for rockets and airplanes. However, these systems suffer from integration drift and need a secondary system to correct their estimates.

A new family of concepts can be proposed using wave velocities and wave travel time between a source and receiver located at the ends of a drill string. These concepts draw their cue from vertical seismic profile measurements while drilling. The waves for application can be acoustic waves in drill string, pressure waves in mud column or electromagnetic waves in subsurface. The biggest challenges in materialising these concepts are creating an accurate velocity model and drift in clocks. State of the art quartz based downhole clocks may have a measurement accuracy in milliseconds which will limit the accuracy of estimated depth to a few meters.

There are inherent advantages in using correlation of geological markers for downhole depth estimation as it can be built on current logging while drilling systems and does not require a new development in measurement technology. On the other hand, the correlation part can be built upon pattern recognition methods from image analysis or cross-correlation from signal processing domains which further reduce total development effort. It is also a superior choice over other systems as its usability can be tested with available log data for use in any geological setting and a system can easily be tuned to specific requirements.

Figure 4A:
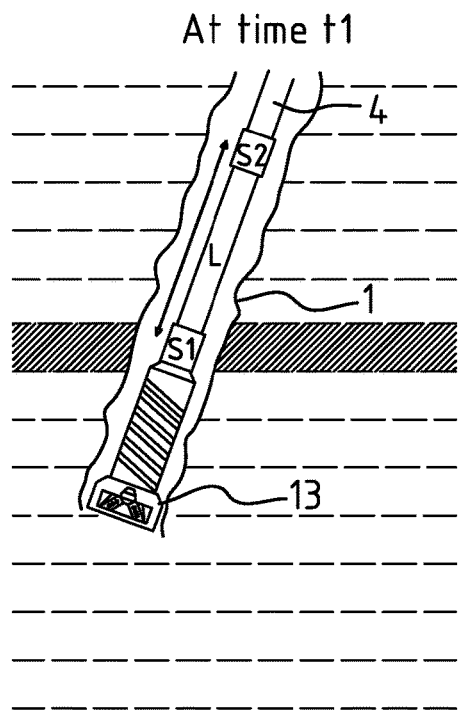
FIGS. 4A and 4B show cross sections of exemplary embodiments of a marker-detector system for measuring incremental depth, at times t1 and t2 respectively.
Figure 4B:
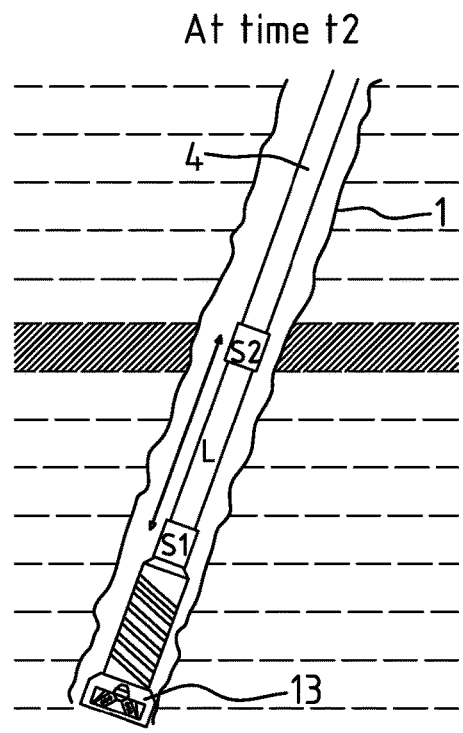

Referring to FIGS. 4A and 4B, the concept of incremental depth estimation using geological markers involves making continuous measurements along the borehole with two or more sensors (S1, S2), arranged for instance in the BHA and separated by a known distance L. The time difference between appearances of the same log signature on those measurements is calculated. The measured time difference and the known spatial separation L between the sensors S1 and S2 allows to calculate the average rate of penetration (ROP). The calculated ROP can be integrated to calculate incremental depth along the borehole 1.

A schematic of the arrangement is shown in FIG. 4A, wherein S1 and S2 are identical sensors located in the bottom hole assembly and spaced apart a distance L. In FIG. 4A, the first sensor S1 passes an area having a high gamma ray signature at time t1. The second sensor S2 passes the same high gamma ray signature g1 at time t2. As the sensors are a distance L apart, the drill string has progressed a distance of L along the borehole in time (t2−t1).

Hence average rate of penetration (ROP) is $$ROP = \frac{L}{t_2 - t_1} \quad (1)$$

By integrating the ROP, a change in depth ΔD can be calculated:

$$\Delta D = ROP * \Delta t \quad (2)$$

while incremental depth D can be calculated by adding each change in depth $$D = \Sigma_0^t ROP * \Delta t \quad (3)$$

One of the elements of this concept is correlation of multiple logs to identify the appearance of every unique point in subsurface on all these logs. Correlation of subsurface measurements has for instance the following challenges:

1) Downhole measurements may have erroneous values which need to be filtered out from the data sets to be correlated;

2) The downhole measurement at the same location along the borehole may provide a different measurement value on respective sensors. The difference between measurements requires the introduction of tolerance bandwidths to account for measurement precision of different tools;

3) Within the same formation, variations in measured values of any rock property along the borehole may be very small. Thus, the rock property selected for correlation should have associated measurement precision less than the minimum anticipated variation. This may require the use of different types of measurements in different formations or different sensor designs.

In order to cope up with the above mentioned challenges, an algorithm to indicate for such a correlation exercise needs to be flexible, to enable the algorithm to adapt to subsurface chemistry and rock properties. In general, any suitable logging assembly or group of logging assemblies can used for making correlation, as far as rock properties vary sufficiently along the borehole depth.

The system is insensitive to the location of the sensors. The sensors can be near or far from the bit. Preferably, the sensors are comprised in the BHA 12. Azimuthal measurements can be made also, for correlation of multiple data points at different subsurface locations.

Figure 5:
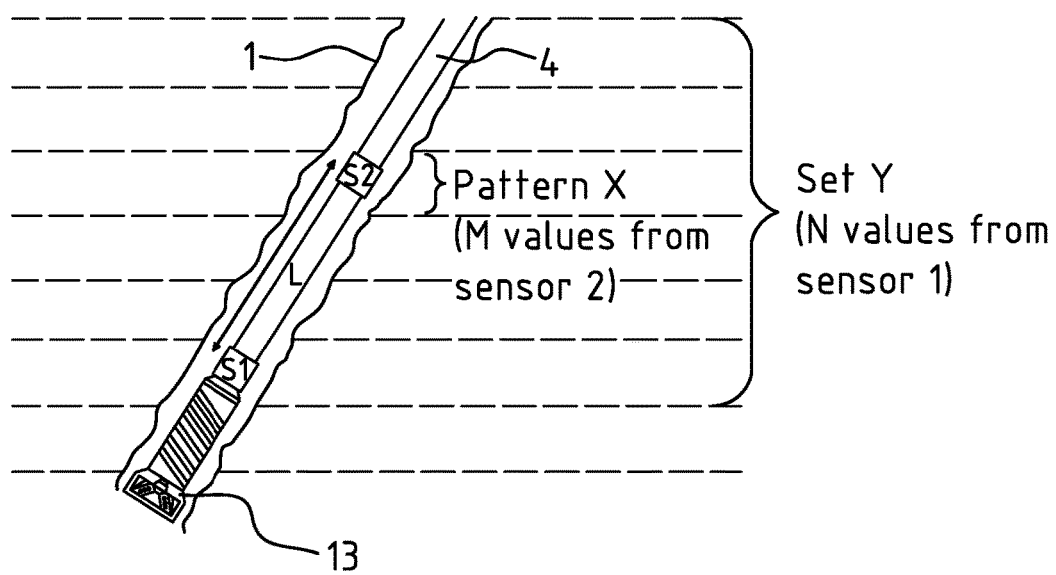
FIG. 5 shows a cross section of en exemplary system for measuring incremental depth.

A basic arrangement for the concept is shown in FIG. 5. The first sensor S1 is the leading measurement instrument in the borehole. The second sensor S2 is the trailing measurement instrument.

The first sensor S1 has collected a dataset Y, comprising N measurement values. The second sensor S2 collects a second dataset X, or pattern X, comprising M values. Herein, M<N. The control unit 20 (not shown in FIG. 5; See for instance FIG. 3) tries to match the dataset M at a specific location within the dataset N, using a predetermined algorithm. The dataset N is sufficiently large to include all possible matches corresponding to dataset M.

Figure 6:
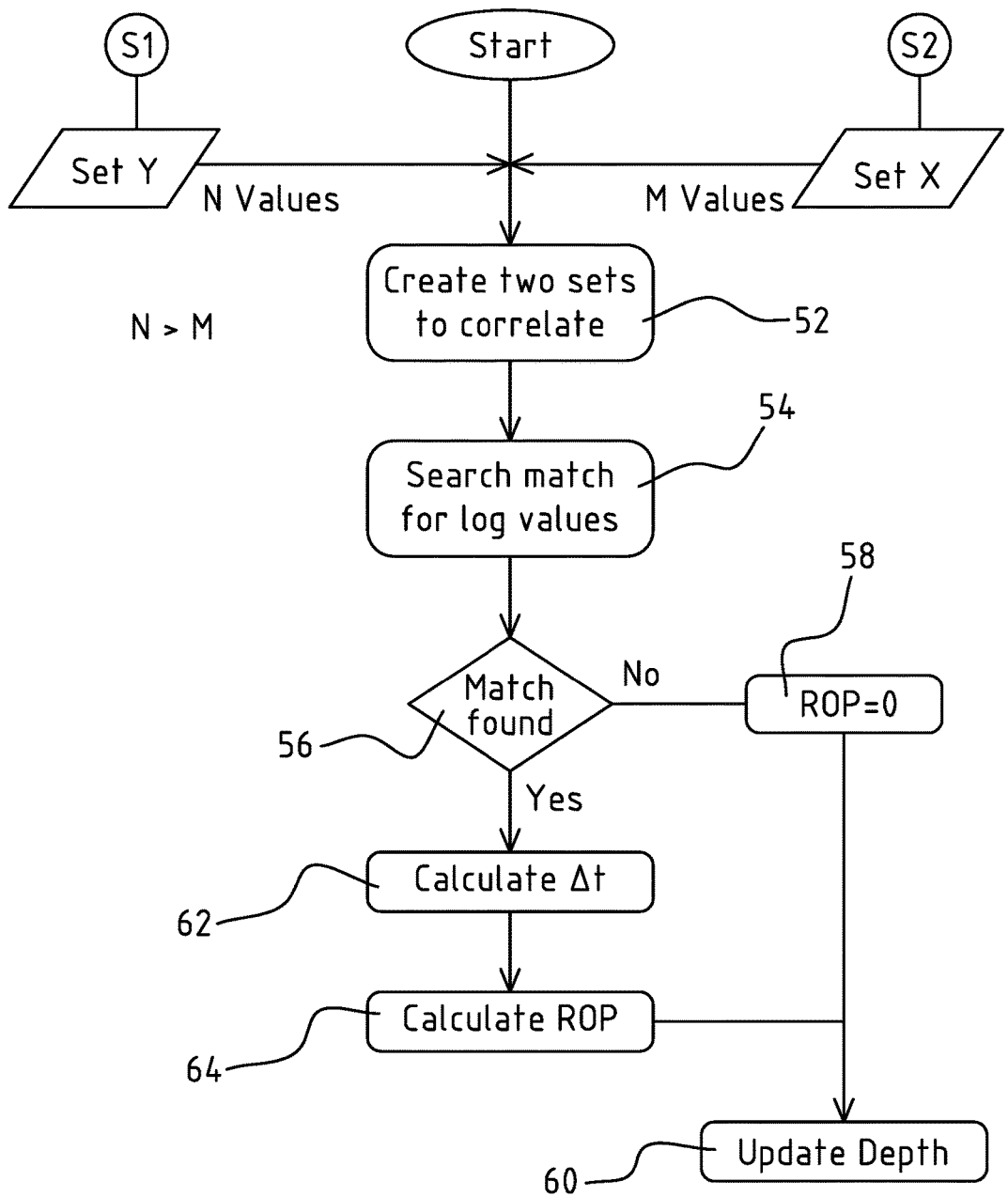
FIGS. 6-8 show embodiments of a flow scheme for the system of the invention.

FIG. 6 shows an example of an algorithm for depth calculation using a two sensor arrangement, to explain the concept. The algorithm of FIG. 6 can be expanded for more than one rock property or more sensors. The main steps of the algorithm are explained below.

In a first step 50, the algorithm commences. The algorithm may for instance commence periodically, at set time intervals. Alternatively, the algorithm may be triggered by a notable event, for instance a significantly increased or decreased value as measured by the leading sensor S1.

In a second step 52, the first sensor S1 and the second sensor S2 provide the datasets Y and X, comprising N and M data points respectively (See also FIG. 5). The datasets Y and X may be dynamically updated by addition of the latest acquired data points and removal of the oldest data points. The value of M and N may be determined for each specific situation and configuration. With dataset X from the trailing sensor S2 and dataset Y from the leading sensor S1, at any time $t_s$:

$$X(t_s) \in \mathbb{R}, X(t_s) = \{x(t_2^j)\}_{j=1}^{M}. \tag{4}$$

$$Y(t_s) \in \mathbb{R}, Y(t_s) = \{y(t_1^k)\}_{k=1}^{N} \tag{5}$$

Respective data points in each dataset are ordered in time, to enable a comparison and to find a correlation between respective datasets. Comparison herein may take into account predetermined tolerances, to deal with formation specific characteristics and to maintain a preselected accuracy.

In a third step 54, any correlation algorithm may be used to identify an acceptable match for dataset X to dataset Y, such that:

$$X(t_s) \approx \tilde{Y}(t_s) \tag{6}$$

wherein $\tilde{Y}(t_s) \subset Y(t_s)$, and $$\tilde{Y}(t_s) \in \mathbb{R}, \tilde{Y}(t_s) = \{y(t_k)\}_{k=a}^{a+M-1} \tag{7}$$

The next step 56 checks whether an acceptable match is found. If not, rate of penetration (ROP) will be set at zero (step 58) and the depth will be updated (step 60).

If an acceptable match is found at step 56, the time difference Δt between measurements from sensor S1 and sensor S2 will be calculated at step 62.

Using the time difference Δt, the rate of penetration (ROP) is calculated (step 64). If the spatial separation between the sensors is L:

$$\Delta t = t_2^M - t_1^{a+M-1} \tag{8}$$

$$R_p(t_s) = \frac{L}{\Delta t} \tag{9}$$

Subsequently in step 60, the depth is updated. A depth increase ΔD may for instance be calculated using the average ROP (calculated in step 64) multiplied by the time difference Δt. Depth herein is incremental depth along the borehole.

One of the components in correlation of geological markers is matching of responses from multiple sensors. In order to find the most effective pattern match algorithm for the specific purpose, different domains such as string matching in text editors, signal processing and image processing were explored. Each of these methods has its own advantages, rendering it each most suitable for different situations. Preferably, the ultimately selected algorithm is most efficient and employable for application in a borehole. The selection of a potential matching algorithm for correlation in the present invention is made based on the specific needs and properties of the datasets, detailed below.

1. All data in the dataset is numeric. This allows to use numerical operations for comparing possible matches.

2. Due to the known size of pattern X and dataset Y, the upper limit on number of measurements outside the tolerance band resulting in mismatch can be quantified and chosen as per need to ease complexities.

3. A mismatch is only limited to having a different value in the dataset Y corresponding to the value in dataset X. The mismatch does not include cases of missing values in dataset X or dataset Y.

4. Two values within a given tolerance should be considered a match.

5. In case there is no suitable match once in a while, the respective measurement or data point (for instance a dataset X at a specific time $t_s$, or a datapoint with said dataset X) can be ignored in respect of the ROP calculation at step 64. Instead, the previous ROP can be used for the calculation of depth in step 60, as ROP will not change drastically from one measurement to the next.

6. A size of dataset X and dataset Y may be considered relatively small compared to text search problems in editors.

The matching algorithm is therefore expected to refrain from any computational capacity related issues, even with the use of brute force algorithms.

Based on the unique needs and simplicity of the problem, two possible solutions for pattern matching are considered and explained herein below.

I. Normalised Cross-Correlation Algorithm

Cross correlation is a method used in signal processing to recognise time-lag between two signals. The same has been used in determining average rate of penetration at the end of drilling, after receiving the logs on the surface. The cross correlation method calculates a correlation coefficient for all possible matches. The highest value of the correlation coefficient identifies the most probable match. The size of the pattern still remains a variable of choice and can be optimised. This method may be computationally more expensive than other algorithms as all possible matches need to be checked and/or more complex calculations may be involved.

If a dataset Y of N data points and dataset X of M data points are taken from measurements made by leading sensor S1 and tailing sensor S2 respectively, such that formulas (4), (5), (6) and (7) apply, then the correlation coefficient for any subset $\tilde{Y}(t_s) \subset Y(t_s)$ is given by:

$$r_i = \left\{ \frac{\sum_{l=1}^{m}(x_l - \overline{X})(y_l - \overline{Y})}{\sqrt{\sum_{l=1}^{m}(x_l - \overline{X})^2} \sqrt{\sum_{l=1}^{m}(y_l - \overline{Y})^2}} \right\}_{i=1}^{N-M+1} \quad (10)$$

The denominator in formula (10) serves to normalise the correlation coefficients such that $-1 \leq r_i \leq 1$, wherein the bounds (values −1 or 1) indicate maximum correlation and "0" indicates no correlation. A high negative correlation indicates a high correlation but of the inverse of one of the series.

One of the key advantages of cross correlation is the ability to handle any drift in the sensors. Any offset caused by sensor drift will not affect the cross-correlation coefficient as the offset will also reflect in the mean which is subtracted from both the dataset Y and the dataset X in the numerator and denominator, leaving the cross correlation coefficient unchanged.

II. Hybrid Matching Algorithm

A hybrid matching algorithm pattern is a matching algorithm for the application of log correlation, and is a combination of a brute force method and a square distance method. The related algorithm first finds a possible match based on a fit and tolerance criteria using a brute force method. If more than one match qualifies, the match with the minimum squared distance is selected.

The hybrid matching algorithm is flexible in using different sizes of the datasets X and Y (number of data points M and N respectively). This allows for matching depending upon changes in formation properties and drilling parameters. The values of tolerance and fit requirements can be selected based on the type of measurement.

Figure 7:
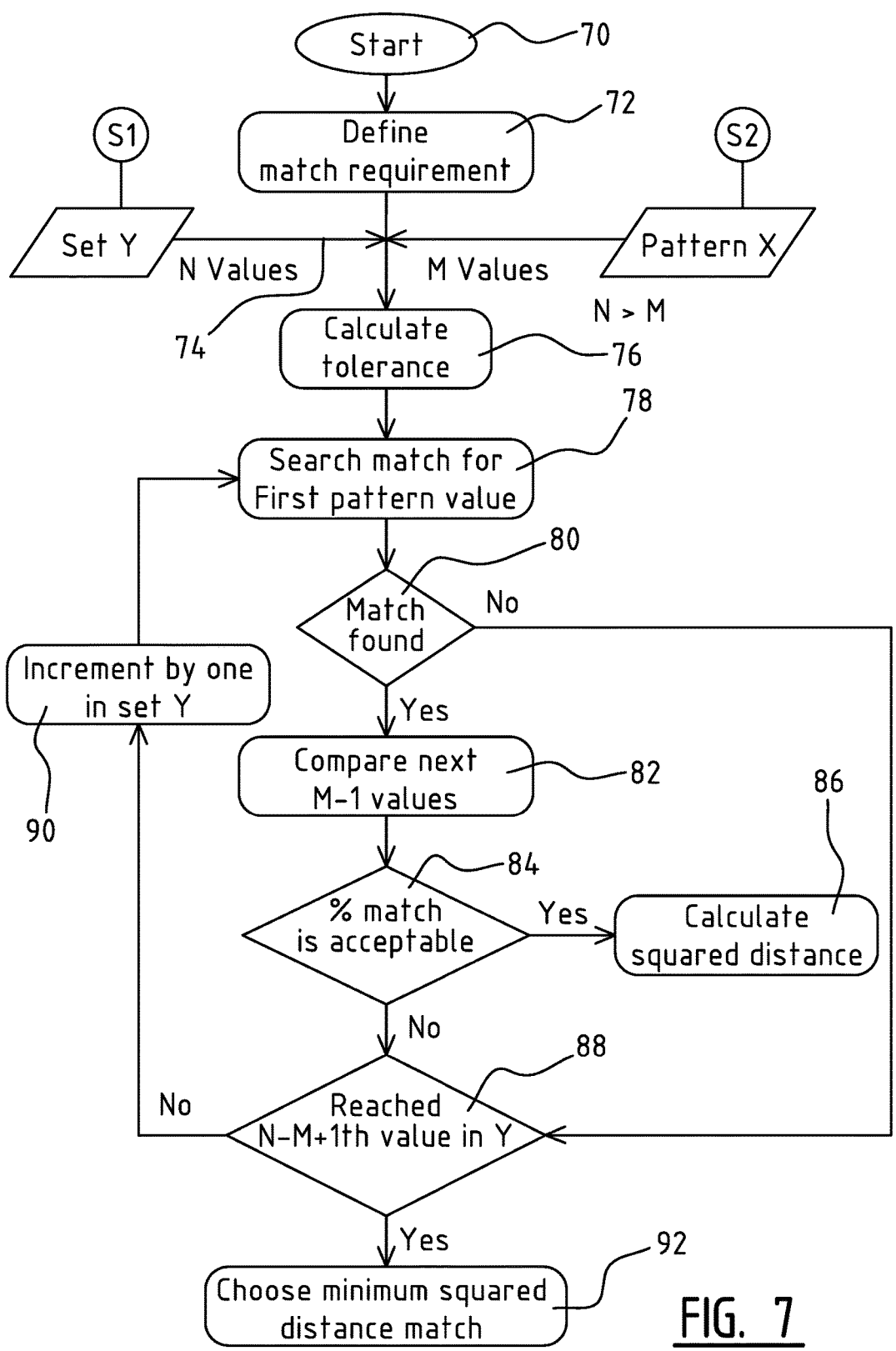

Herein below the algorithm is explained for gamma ray measurements which govern the choice of fit and tolerance on statistical basis. The flow chart of the algorithm is explained with reference to FIG. 7.

The algorithm commences at a predetermined time, indicated by step 70.

In a second step 72, a match requirement μ is set, expressed in %.

Subsequently, in step 74 the first sensor S1 and the second sensor S2 provide the datasets Y and X, comprising N and M data points respectively.

A tolerance τ is calculated in step 76 and further, for each $\tau = \tau_i$, wherein i=[1, M].

For each i=1, 2, . . . (N−M+1), the algorithm checks whether $|x_1 - y_i| \leq \tau_1$. Initially, the first value of the dataset X is selected in step 78 and compared in step 80.

For j=1, 2 . . . M (step 82), the algorithm checks if $|x_j - y_{i+j-1}| \leq \tau_j$.

The algorithm ends if count ≥μ.

In step 84, the dataset X is accepted if a match requirement is fulfilled. The match requirement herein is for instance the match requirement p, expressed in %, as set in step 72.

If the dataset X is accepted as a match, in step 86 a quared distance is calculated.

The above steps are repeated for each value in the dataset Y. A step increment is provided in step 90, and the matching process is repeated from step 78.

When the (N−M+1)th value in the dataset Y is reached, i.e. when the dataset X is matched against the entire dataset Y, step 88 refers the data to step 92 for a minimum squared distance match of all calculated squared distances provided in step 86.

The distance between the two sensors S1 and S2 measuring identical formation properties can have an impact on the associated error with calculated depth. This effect is due to the fact that the calculated ROP at any time is the average of ROP values over the time interval since both the sensors S1 and S2 passed the same subsurface location. Calculated ROP herein relates to the ROP as calculated downhole, as described above. The error introduces a difference between ROP as recorded at surface and the average ROP as calculated downhole.

Often, the calculated values of depth were higher than the actual measured values of depth. In tests, the error increased almost linearly from about 1% for sensor spatial separation distance L in the order of 1 m to about 3 to 3.5% for a distance L of about 10 m.

The more the calculated ROP fluctuates, the more will be the effect of averaging and associated error. If the fluctuation in ROP can be eliminated, the error associated with ROP averaging can be avoided, and theoretically zero error is achievable.

These values are relevant to the hybrid matching algorithm. As gamma ray measurements can be approximated by a Gaussian distribution, statistically about 68% of measurements at any location should produce a count within one standard deviation (±σ). For a Gaussian distribution, the standard deviation can be approximated by the square root of the total count. Using rules of propagation of error, total standard deviation ($\sigma_t$) between the two datasets from different sensors of same design can be given by $$\sigma_t = \sqrt{\sigma_x^2 + \sigma_y^2} \quad (11)$$

Where $\sigma_x$ and $\sigma_y$ are the standard deviation of measured counts at the same location.

$$\sigma_t = \sqrt{x(t_p) + y(t_p)} \quad (12)$$

The total standard deviation ($\sigma_t$) can be used as a tolerance (τ) window to find an acceptable match. Statistically, about 68% of the time values from both sensors corresponding to the same location should lie in the tolerance band of $\pm\sigma_t$, which would provide a fit requirement of 68% for the tolerance of $\pm\sigma_t$.

As the $y(t_p)$ is unknown and need to be found, the total standard deviation can be approximated as:

$$\tau(t_p) = \sqrt{2 * x(t_p)} \quad (13)$$

In the case of drift, the tolerance value calculated above may not remain valid. An additional term to account for the drift may be added and updated with time if drift increases in time. An offset due to drift can be approximated by the difference between the mean of the pattern, i.e. dataset X, and a potential match, such that:

$$\Omega = \overline{X}(t_s) - \overline{Y}(t_s) \quad (14)$$

and a new tolerance value $\tau$ can be given by $$\tau(t_p) = \sqrt{2x(t_p)} + \Omega \quad (15)$$

The size of the dataset Y in which a match for the pattern, i.e. dataset X, will be searched is preferably long enough to contain the pattern in all scenarios. An upper limit on the size of the dataset is provided by the need to minimise any possibility of finding a faulty match which will increase with increase in size of the dataset. To minimize occurrences of a faulty match, the size of the dataset Y is preferably kept to a minimum. With help of calculated average ROP and known sensor separation distance L, an approximate time window can be defined in which the trailing sensor S2 is expected to pass the location of the leading sensor S1.

Suppose the average ROP=$R_p$ and the sensor distance is L. An uncertainty in the ROP is indicated by $\rho$. The time window T available for searching a pattern can be given by:

$$T = \frac{L}{R_p - \rho} - \frac{L}{R_p + \rho} \quad (16)$$

If a time window for making each measurement is given by $\omega$, the length of the dataset Y is given by $$N = \frac{T}{\omega} \quad (17)$$

The size of the pattern, i.e. dataset X, may also be a parameter to be optimised. The pattern is preferably long enough to capture enough variation helping to find a unique corresponding match in the dataset Y. Yet, computational power and time considerations present an upper limit on the size of dataset X. The pattern size can be chosen as constant for a particular formation. For another formation, the size of the dataset X can be iteratively optimised using an algorithm.

For instance using linear regression analysis of the response from the two sensors S1 and S2, an optimum size of dataset X may be estimated. As the difference between measurements from the two sensors S1 and S2 may be represented as Gaussian noise, a minimum representative pattern size for dataset X will preferably provide a linear relation between measurements of both dataset Y and dataset X. I.e., both sensors measure a similar number of counted gamma rays at a certain subsurface location, within a predetermined tolerance. Once this linear relationship is met, adding more data points to dataset X will not add value to the pattern.

In order to assess the effect of the noise level, sensor drift and total count on the depth calculated by hybrid matching and/or cross correlation based algorithms, various simulations were run. Absolute error with time was captured for each case. A pattern size of 25 data points (dataset X) and a set size of 100 data points (dataset Y) were selected. To avoid unrealistically high ROP resulting from a mismatch, an upper limit of 150 m/hr was set for ROP.

The key findings from simulations are:
1. Cross correlation remains unaffected by the offset and produces identical results;
2. With increase in total count the maximum error reduces;
3. In general, the error increases with increase in noise level;
4. The error due to averaging of ROP itself may be up to about 22 m;
5. The error increases more rapidly in more horizontal sections of the borehole. In a horizontal section, the variation in gamma ray readings are more limited, which may result in wrong matches being considered for the depth calculation.

Above, gamma ray measurements were described as a potential measurement for pattern matching, but other measurements may also be suitable. For instance density measurements can also be considered for the same purpose of incremental depth measurement. Both gamma ray and density measurements provided good repeatability.

In general, estimated depth based on density data may be as good as or better than gamma ray based results. Maximum deviation for density based measurements may be in the order of 10 m with respect to surface measured depth (based on the number of pipe sections, i.e. length of the drill string). Maximum deviation for depth measurements based on gamma ray may be about 15 to 20 m. In practice, density measurements require an active neutron source.

There are two sources of error in depth calculated with correlation of logs:
1. Wrongly identified match; and
2. ROP averaging.

Due to the inherent limitation of depth calculation by correlation of subsurface measurements, to minimise the overall error in the measured depth, a secondary system is preferably used in parallel to the proposed system. Required measurement frequency of the secondary system depends on the error in the primary system and the limiting value of the acceptable error. Two possible methods for such a secondary system are explained next. In parallel to the proposed system, adding one or more secondary systems can improve overall quality of the depth estimation.

Correction with Help of Pipe Tally Data

One of the easiest solutions to introduce a correction in the estimated depth is by down-linking from surface. The total length of the drill string is available at surface in the form of the number of drill pipe sections. For instance, each section of drill pipe may have a length of, for instance, about 10 m. The total length of the drill string is about equal to 10 m times the number of sections. The incremental depth of the borehole would be about equal to this total length of the drill string, at least when the drill bit engages the downhole end of the borehole. The total length of drill pipe can be transmitted to and stored in a downhole system. A signal 24 can be triggered with the making of each section of drill pipe. The signal 24 can then be transmitted downhole through the mud column (See FIG. 2).

Upon receipt of the signal 24, the downhole system can identify the addition of another pipe joint to the drill string.

Figure 8:
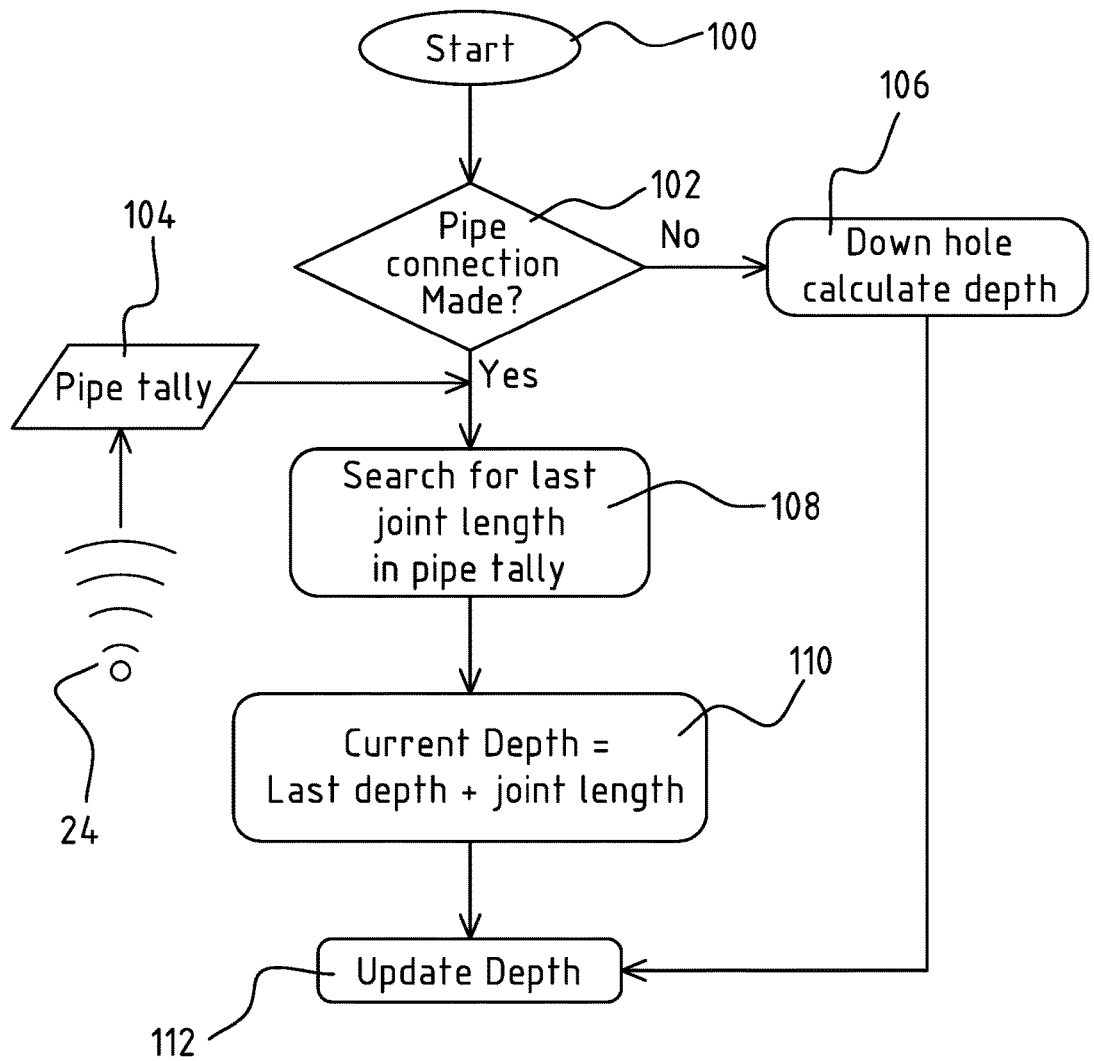

Adding the length of each tubular section incrementally enables the downhole system to calculate the total length of the drill string in the well and hence the associated incremental depth of the borehole. An algorithm for such a system is explained in FIG. 8.

The algorithm starts at step 100.

In a second step 102, the downhole control unit 20 checks if an additional section of drill pipe has been added. In practice, the control unit checks whether it has received a mud pulse signal 24 (see FIG. 2) indicating the addition of a drill pipe section.

If no signal 24 was received, the algorithm continues to step 106, wherein downhole depth is calculated. The incremental depth is subsequently updated at step 112.

If the control unit 20 did receive a signal 24, at step 104 the algorithm indicates the addition of a drill pipe section.

At step 108, the algorithm obtains the most recent number of pipe sections included in the drill string. Said number provides a measure of the total length of the drill string.

At step 110, the algorithm calculates the incremental depth of the borehole, by adding the predetermined length of one drill pipe section to the most recently stored incremental depth. I.e.: Current incremental depth=Last depth+1 length of a drill pipe section.

At step 112, the current incremental depth of the borehole is stored, and replaces the last depth.

Although this system utilizes mud pulse telemetry for the transfer of signal 24, due to infrequent transfers (depending upon joint length and ROP) overall bandwidth requirement will be limited. However, the errors of surface based measurements also penetrate the downhole measurement system and no absolute correction can be made without incorporating any mathematical model for estimating the error associated with surface based measurements.

Correction by Man-Made Marker Tracking

Building on the concept of correlation of geological markers, another concept for downhole estimation of incremental depth is based on creating a mark in the subsurface. The principle basically concerns the use of a source 120 (N) to create a marker 122 in the formation 2 at time t1 (FIG. 9A), and then detecting the marker 122 by a trailing detector 124 (D) at time t2 (FIG. 9B).

When the detector 124 detects the mark 122, it infers that the drill string has advanced by a distance L equal to separation L between the source 122 and the detector 124. Incremental downhole depth can be calculated in multiples of marker-detector separation L. By measuring the time difference $\Delta t=(t2-t1)$ between the creation of a mark and its detection, the average ROP can also be calculated.

The source 120 may be a nuclear source. Radioactive nuclides such as Californium-252 or accelerator based systems are available as nuclear source for logging, i.e. to enable measuring subsurface properties such as bulk density and porosity. On bombarding subsurface elements with neutrons, the elements can be activated to unstable nuclides which on deactivation yield radiation having specific characteristics. A specific section of the borehole can be activated with the help of a switchable or pulsed neutron source. The neutron source may be a commercially available pulsed neutron generators. A Pulsed Neutron Decay (PND®) Spectrum Tool is for instance marketed by Weatherford® International Ltd.

The radiation of activated elements in the formation may include any nuclear radiation, alpha, beta, or gamma ray. In practice, the radiation will be gamma ray radiation. Gamma rays herein indicate electromagnetic radiation, having wavelengths similar to X-rays but typically with shorter wavelengths and (thus) higher frequency. The gamma radiation herein originates from gamma decay, i.e. the decay of an activated nucleus which will usually emit a single gamma photon.

By identifying the characteristic emissions from decay of unstable nuclides, the location of such emissions can be identified. This provides a concept for a subsurface marker-detector system using a neutron generator as a neutron source 120 to create an activated zone as marker 122, and a nuclear radiation detector 124 to detect nuclear radiation emitted by the activated zone. The detector 124 may be a gamma ray scintillator based detector.

The formation typically comprises an enormous variety of elements, for instance making up the compounds of rock formation and associated fluids. However, not all subsurface elements are suitable for the marker-detector system of the present invention. The suitability of the elements depend on three major factors:

1. Neutron capture cross-section: This signifies the probability of activation of any nuclide for a given neutron energy at a given temperature;

2. Abundance in the subsurface: The higher the concentration the higher will be the yield of activated atoms and the more will be the characteristic radiation from deactivation; and 3. Decay constant: The half-life of the radioactive nuclide created from the neutron capture signifies the number of decaying atoms at any given time. Nuclides which are highly unstable decay in very short time which might not be enough for the detector to reach the activated location and capture decay photons. On the other hand, nuclides which are almost stable will not decay in a sufficient number to give a detectable signal.

On considering half-life of most common elements in subsurface, some of the most favourable elements are chlorine isotope Cl-37, silicon isotope Si-30 and naturally occurring sodium Na-23. Both chlorine and sodium atoms are present as ions in saline formation water. Silicon is often present in silicate mineral in sandy and shaly formations. Even though chlorine and silicon are abundant in nature, usually Cl-37 and Si-30 isotopes occur in lower concentrations (24% and 3%, respectively) and have lower neutron capture cross-section (0.433 and 0.11 barn, respectively). Detailed calculations may be required to evaluate the number of activated atoms and resulting photons.

For any activated element, at any given point in time the amount of decay depends upon the concentration of radioactive nuclides. With increasing time, the concentration of activated nuclides decreases exponentially and so does the radiation from the decay. Hence, to obtain a stronger signal, the separation between detector and source is preferably small. But the neutrons from the source travel in all possible directions and are not restricted to the formation just in front of the source. Due to larger region of activation with smaller marker-detector separation it will be very difficult to precisely locate the source position corresponding to activation. Hence the distance between source and detector need to be decided such that the concentration of activated nuclei remains high enough yet the locations remain distinguishable. Also, the detector may be shielded from the neutron source.

To investigate the feasibility of the concept and resulting signal from activated nuclei in subsurface, nuclear simulations were carried out to simulate the neutron and photon transport in the subsurface. These simulations are carried out with MCNP. It is a Monte Carlo based general purpose nuclear transport code capable of simulating time based transport of nuclear particles such as neutron, photon and electron through generalised geometries. Monte Carlo based calculations involve the behaviour simulation of each particle with the help of statistical sampling using random numbers from their probability distributions. It consists of actually following each particle from its source throughout its life to its death in some terminal category (absorption, escape, etc.). Probability distributions were randomly sampled using transport data to determine the outcome at each step of its life. The concept validation requires simulation of two problems:

1. Activation of suitable isotopes
2. Detection of photons generated from deactivation Both these problems require separate simulations in the MCNP code. In the first simulation transport of neutrons from the neutron generator till their capture in the formation is carried out. Output of the first problem gives the location of activated isotopes resulting from the neutron capture. This output is used to create the input for the second problem. As the location of the start of photons is the location of the activated nuclide and is known, to complete the input for second problem a statistical sampling of decay time with the help of random numbers and the decay constant of the nuclide is used to associate the time of decay with each nuclide. This space and time domain photon source is used in a second simulation to simulate transport of photons in the subsurface to count the number of photons which can reach the detector. These photons quantify the strength of signal in the detector and its number should be big enough to be detected and to be distinguished from background noise for this concept to work.

In a first simulation, a simplified model of the formation was created. The model included a block of rock (the formation), comprising a borehole wherein a nuclear source was positioned. The block of rock was 5 m×5 m×5 m. The borehole was 20 cm in diameter. The source was 5 cm high. The modelled rock type was a sandstone reservoir having 30% porosity and a salinity of 30,000 ppm.

It is assumed that salinity is predominantly due to sodium chloride. Herein, probably about 25% of chlorine atoms are Cl-37 isotopes, as occur naturally.

A borehole of diameter 20 cm was modelled filled with water to simulate drilling using water based drilling fluid. The neutron source and detector are preferably included in the BHA. Consequently, the source and detector are considered to be located at the axis of the borehole. The neutron source is a 14.1 MeV, D-T source having a neutron yield of about $10^8$ neutrons per second. This is an industry standard specification for a pulsed neutron generator. The source is modelled as a 5 cm long cylinder with 3 cm diameter (FIG. 10B).

In a second simulation, the detector 124 is modelled as a NaI scintillation crystal of a well type design with a height H of 5 cm and having 6.5 cm inner radius $r_i$ and 8 cm outer radius $r_o$ to give larger capture volume (FIG. 10A). The detector will be moving with the BHA while drilling ahead.

To determine the effect of detector position on the signal strength, four detectors 124 were modelled (as shown in FIG. 10B). One detector 124(1) is modelled at the location of the source 120. Three other detectors are located at a spatial distance of 10 cm (Detector 124(2)), 15 cm (Detector 124(3)) and 20 cm (Detector 124(4)) from the source 120. The photon flux in time is calculated for each detector, to identify a time window wherein the signal strength is sufficiently strong.

The neutron transport simulation was carried out for $10^8$ neutrons. The location of each activated nucleus is obtained in a so called PTRAC file. On post processing the PTRAC file, the number of activated atoms of Na-23, Cl-37 and Si-30 were found to be 14050, 3222 and 5555 respectively. As Monte Carlo simulations use random sampling of a probability distribution, the uncertainty in the results usually reduces with the increase in number of source particles (nps) for the run. When the number of source particles increases by a factor of 10, the standard deviation of total flux per source particle over $10^5$ seconds (27.8 hrs) in detector 4 get reduced to 31% (from 0.0325 to 0.0100).

As the neutrons start uniformly in all directions from the source, it is of interest to examine the spread of activated nuclei along the axis of the borehole. The tests suggest that the axial spread of activated nuclei is limited to about 20 cm with respect to the location of the source. The largest number of activated nuclei will be at the location of the source. The number of activated nuclei will fall, for instance according to a Gaussian distribution, on both sides of the location of the source. Tests show that the number of activated nuclei along the axis of the borehole falls to less than 50% with respect to the source location within +/−5 cm. The axial spread of activated nuclei with respect to a axial center of the marker 122 is limited to about 20 cm. The detection accuracy can be improved by using a accurate detector.

Due to the limited axial spread, the axial position of the marker 122 can be determined with relatively good accuracy. The accuracy is, for instance, about +/−5 to 10 cm. Achievable accuracy for detection of the nuclear marker using the marker-detector system of the invention may be in the order of +/−5 cm or less. Thus the marker system of the invention can improve the accuracy of incremental depth measurement, for instance when the nuclear marker system of the invention is used as a secondary system.

The signal strength in the detector depends on

1. Proximity of the detector to the activated location; and
2. The time elapsed after activation of the nuclear marker.

Radioactive nuclides follow exponential decay. If the number of photons produced per unit of time remains constant, the signal in the detector should increase while closing in to the activated location 122 due to increase in concentration of activated nuclei. But due to the exponential decay, the number of photons emitted by the nuclear marker and the associated signal decreases exponentially in time. Hence, the actual signal in the detector 124 will be the resultant of a linear increase in signal due to the detector closing in to the source location (i.e. the increase and subsequent decrease in signal strength as the detector moves from positions 3 to 2 to 1 to 4 in FIG. 10B during drilling) and exponential decrease of the nuclear emission signal itself.

Analysis of photon transport has shown that the flux increases while closing in to the activated zone, for instance about five times from a distance of 20 cm to 0 cm. Assuming a modest ROP of about 8 m/hr, a distance of 20 cm can be drilled in about 90 seconds. During these 90 seconds, the signal strength of the nuclear emission reduces less than 5%. For ROPs in the range of about 5 to 15 ft/hr (1.5 to 5 m/hr), a distance of 20 cm can be drilled in about 8 to 2.4 minutes. This is well within the half-life of some typical elements, thus enabling use of the present system at the indicated accuracy rates. For instance, Chlorine Cl-38 has a half-life in the order of 37 minutes, whereas Sodium Na-24 has a half-life in the order of 15 hours. Depending on the specific isotope providing the nuclear decay signal, the reduction in signal strength of the nuclear emission reduces (much) less than 5%. The signal strength increase when the detector closes in on the activated zone 122 is the dominant factor compared to the typical exponential nuclear decay.

In view of the above, during a typical drilling operation having a rate of penetration of about 8 meter/hour or more, the accuracy above, i.e. in the order of +/−5 cm or less, will be achievable despite nuclear decay.

The number of light photons generated for the incident gamma ray varies based on the type of scintillation crystal used in detector. However, for every crystal the efficiency of converting the incident gamma ray into a light photon depends on the geometry and the energy of incident radiation.

The energy of most photons crossing the detectors is in the order of 0.5 MeV or less. As the efficiency of scintillation crystals increases (for instance NaI, see FIG. 10A) with decreasing photon energy, this will result in a higher signal in the detector. A peak related to characteristic energies for Si-31, Cl-38 and Na-24 are about 1.3, 2.1 and 2.75 MeV, respectively.

The peaks are relatively small, so the detector 124 is preferably relatively sensitive. For instance, in an embodiment the detector may include multiple detector elements, together providing a detection signal of the marker 122. In another embodiment, the detector may be relatively large. In practice, a relatively large detector herein would imply a detector comprising a relatively large detection surface or detection crystal. The latter is explained in more detail below.

The motivation for downhole depth estimation lies in application of downhole depth estimation for automated subsurface navigation. An accurate depth estimate may facilitate automated subsurface navigation based on a closed loop. The depth estimate available downhole may also eliminate errors due to surface based measurements in ROP and depth.

In the subsequent section a scheme is proposed for automated subsurface navigation. Herein, downhole depth and survey data are used to follow a predefined borehole trajectory in combination with a steerable drilling system.

The main objectives of subsurface navigation are:
1. Reaching the reservoir while maintaining optimal well trajectory;
2. Following the reservoir layer while fulfilling geosteering objectives; and/or
3. Avoiding geological hazards on the way to the reservoir.

Figure 11:
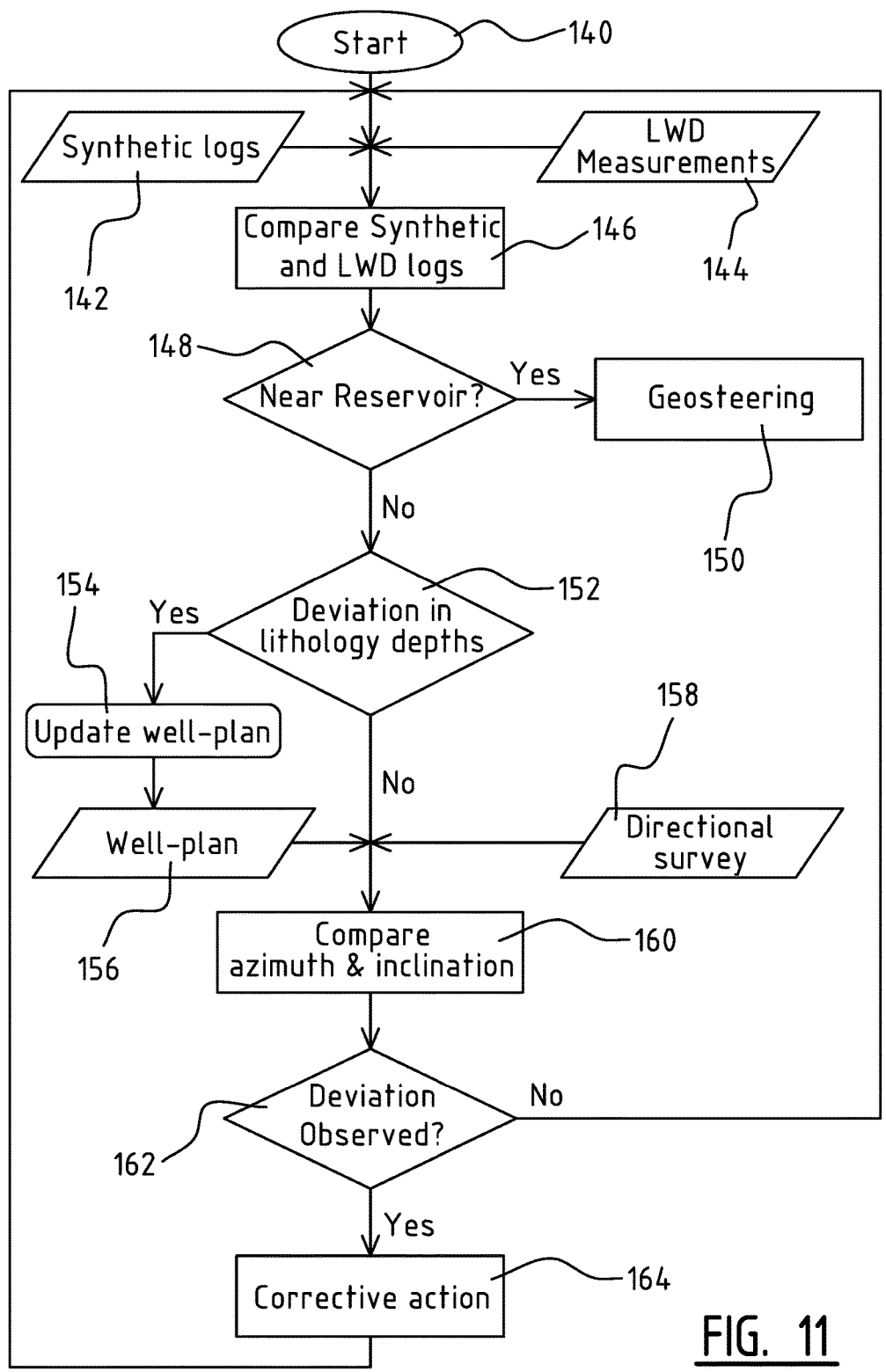
FIG. 11 shows a flow scheme for the system of the invention.

FIG. 11 shows a simplified scheme for reaching the target reservoir layer using automated steerable drilling.

The scheme for automated drilling starts at first step 140.

In step 142, synthetic logs are created. Synthetic logs herein are pre-calculated logging results, based on the expected properties of the expected formation layers. Said expected properties and expected formation layers are provided by specialized geological software, using the results of geological tests that were performed before the drilling of the borehole commences. The synthetic logs are pre-calculated at surface before the drilling commences, and stored in a storage medium coupled to the control unit 20. In automated drilling, said storage medium (not shown) and the control unit 20 are included in the BHA (See FIG. 3).

As indicated by step 146, a logging while drilling (LWD) tool (not shown), which is typically included in the BHA 12, provides logging results of the formation during drilling.

In subsequent step 146, the scheme compares the logging results of the LWD tool with the synthetic logging results.

In a next step 148, the scheme checks whether the logging results indicate that the downhole end of the borehole has reached a predetermined formation layer. Herein, the scheme may take into account certain threshold characteristics, such as depth, formation pressure, density, resistivity, etc.

If the result of step 148 indicates that the borehole is within the predetermined threshold distance with respect to the reservoir layer, the scheme switches to step 150. Herein, the scheme switches to a geosteering scheme.

Well-plans are created by drilling engineers using available seismic measurements, log data and geological information, to avoid a collision with existing wells and to achieve an optimum wellbore trajectory to reach the reservoir. A directional driller uses these well-plan for well placement. In an automated drilling environment, the well-plan can be used to enter the reservoir, whereas thereafter the geosteering algorithm can be deployed for drilling the reservoir section to meet the well objectives.

The well-plan comprises measured depth, inclination and azimuth values. Both inclination and azimuth values are also measured in a directional survey. By continuous monitoring of a planned and measured well path and calculating the deviation, corrective actions can be taken real time for following the planned borehole trajectory. A synthetic log response can be created with the help of log data from the offset wells beforehand to identify approaching the reservoir and correspondingly the entry can be established. Similarly such a synthetic log response can also be used to determine key geological depths for setting of the casing shoe and corrections can be made in the original well-plan accordingly.

A typical steerable drilling system may be programmed at surface. The program may comprise tool settings and tool face angles to achieve a desired build-up and turn rate. The program provides the flexibility and precision to enable complex three dimensional borehole trajectories. The number of available tool settings varies from tool to tool. Dogleg severities achievable at any setting depends on many parameters such as rock properties, inclination of hole, BHA design, drilling parameters, etc. Of these parameters, the rock properties, such as anisotropy and formation strength, have a relatively high uncertainty and are often responsible for deviation from a predicted behaviour and trajectory.

A downhole system of drilling automation enables the utilization of real time downhole measurements of bit performance and downhole drilling parameters to iteratively correct a bit behaviour model and use the measurements to adjust tool settings.

To achieve automated subsurface navigation, the performance of downhole tools in terms of their angle building capability is modelled. A simplified mathematical model may be used to mimic the tool performance predicted by complex modelling software. In a simplified model, it can be assumed that the dogleg severity ($\beta$) achievable is proportional to side cutting force ($F_s$) on the bit 13.

Figure 12:
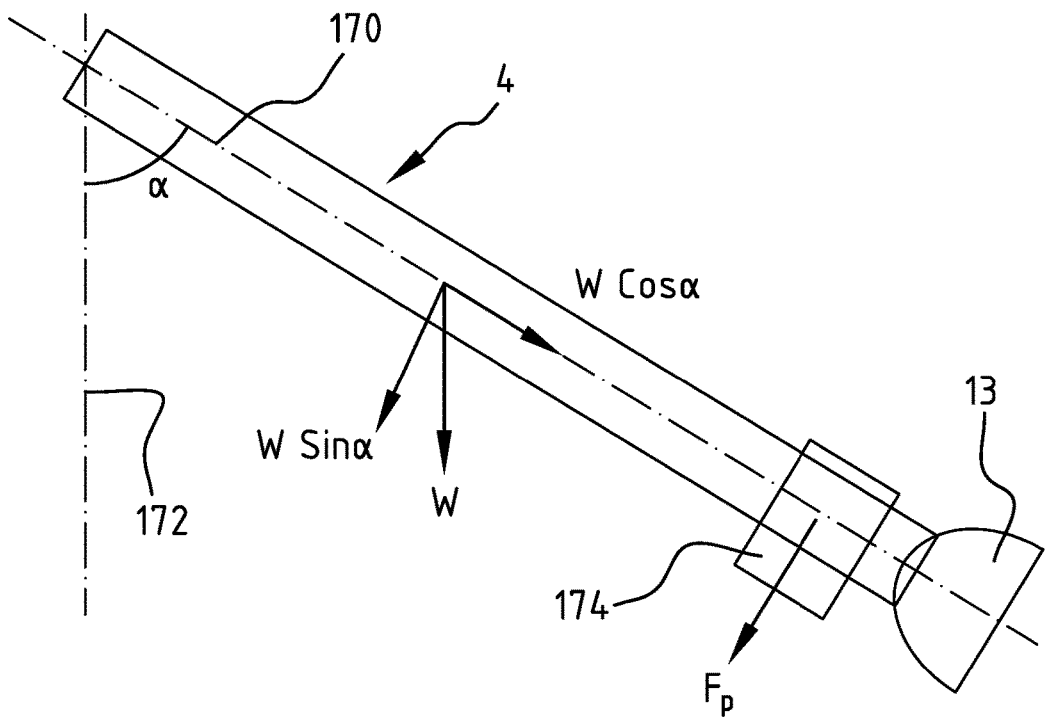
FIG. 12 shows a cross section of an embodiment of the system of the invention.

FIG. 12 shows the downhole end of the drill string 4, having drill bit 13. A centre line 170 of the drill string is arranged at an angle $\alpha$ with respect to a perpendicular 172, typically a line straight down aligned with gravity. The dogleg severity ($\beta$) can be expressed as:

$$\beta = kF_s \quad (18)$$

wherein k is a proportionality constant [deg/Nm], which can account for factors such as bit design, rock properties and BHA design.

A side force $F_s$ on the bit 13 in case of a 'push the bit' design may comprise a component of drill string weight W due to hole inclination and drill string compression due to drill string bending. In addition, the side force $F_s$ may include a force applied by a steering device 174. The steering device may comprise retractable pads to engage the borehole wall, to provide said force.

Various arrangements of stabilizers can be used to give a BHA required build, drop or hold tendencies. These arrangements allow the BHA to bend into a desired direction as an elastic beam supported on the borehole wall through stabilizers. The steerable drilling system may for instance use hydraulically operated pads to create the side force and/or use fluid jets.

Conventionally, the side force is controlled by a directional driller from surface. The directional driller communicates with the downhole system with help of mud pulse telemetry, as shown in FIG. 2.

In a simplified arrangement we can assume one near bit stabilizer creating a small pendulum effect. This will increase the drop rate and reduce the build-up rate. Based on this assumption build up rate can be simplified to $$\beta = k(F_p + W \sin \alpha) \quad (19)$$

Herein, the borehole is inclined at an angle $\alpha$ with respect to the vertical axis 172, as shown in FIG. 12.

To validate the model and tune it with realistic values of proportionality constant k, the weight W and the side force $F_p$, steerable drilling data are used, as obtained for a certain steerable drilling tool while drilling a certain borehole. The steerable drilling tool may have a number, for instance 10 to 15, settings of tool deflection, resulting in different side force $F_p$.

To mimic the same behaviour, it may be assumed that the side force $F_p$ increases linearly with the increasing tool setting, neglecting other effects. Using initial values of k=1 deg/kNm, W=1.4 kN and $F_p$=5 kN, a computer program predicted BHA behaviour can be created.

The same model is used in demonstrating the integration of downhole depth measurement with control of the steerable drilling system to follow a given borehole trajectory. In practice, any deviation between actual performance and model prediction can be accounted for in the proportionality constant k, which can be updated based on real time performance evaluation. The simplicity of the model gives an automated drilling system more robustness and operational ease.

Adherence to a predetermined trajectory is checked and maintained. Real time comparison of wellbore plan (i.e. the stored predetermined trajectory) and actual borehole trajectory results in adjustment of the trajectory, to conform to the planned trajectory as much as possible.

However, the response of the steerable drilling system to formation layers and drilling parameters may deviate from predicted behaviour. At any given tool setting, the build-up or drop angle can vary and result in deviation from the well-plan. The directional driller at surface changes the tool setting of the steerable drilling tool in order to minimise the deviation based on experience.

In practice due to the limitation of band width in current mud pulse telemetry systems and associated time lag there will still be an deviation between the actual trajectory and the planned trajectory. In an automated system, the planned trajectory is stored in the BHA where downhole depth, inclination and azimuth will be available. By comparing real time measurement of actual trajectory with the planned trajectory, the deviation can be minimized and drilling performance can be improved.

Figure 13:
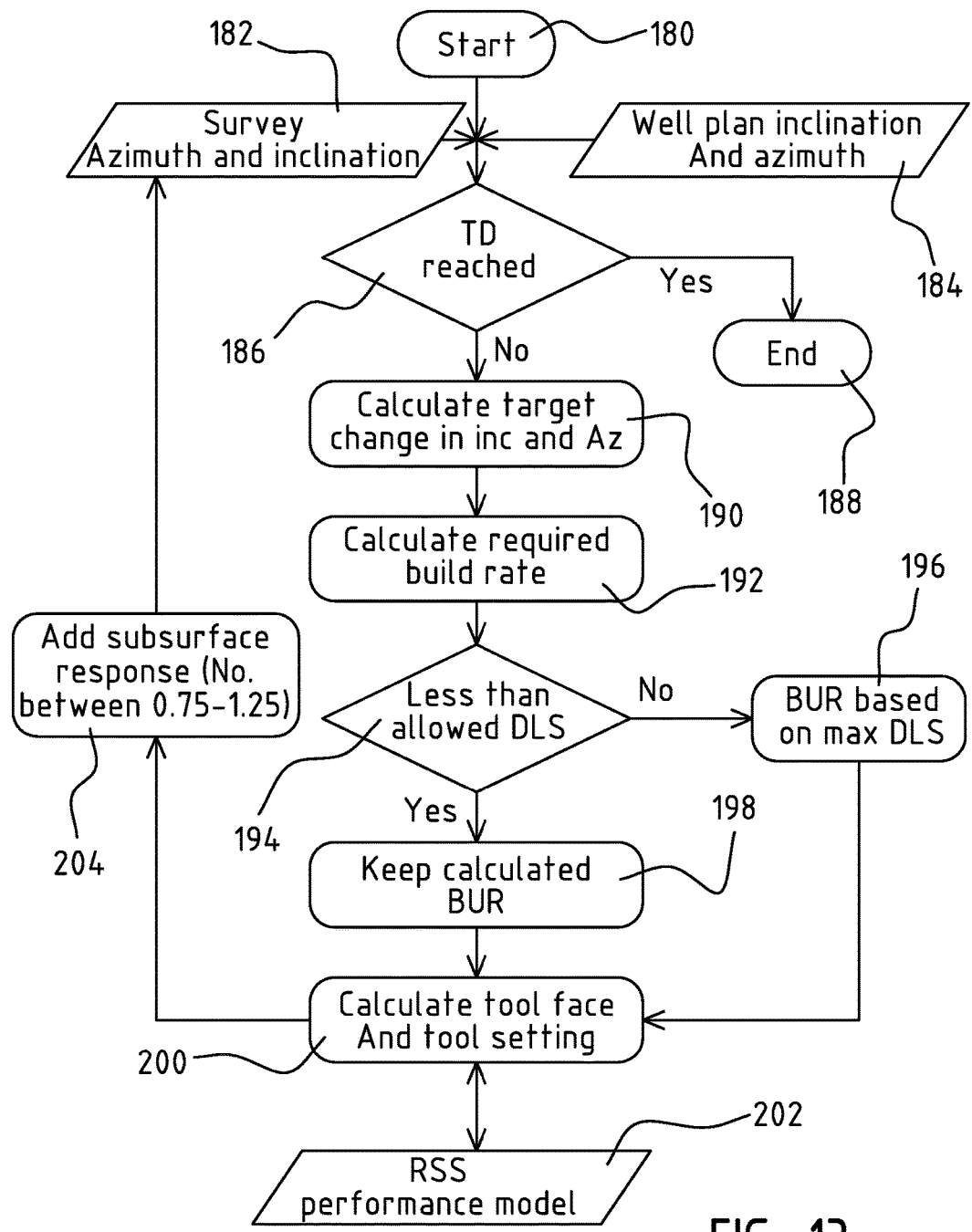
FIG. 13 shows a flow scheme for the system of the invention.

Automated drilling according to the invention is described with reference to the scheme in FIG. 13.

The scheme starts at step 180.

Measured values of borehole characteristics are provided in step 182. During drilling of the borehole, survey instruments, such as a LWD tool, provide measured values of, for instance, borehole inclination, azimuth, and depth. These measured values may be provided at any subsurface location along the borehole trajectory. Depth herein may be measured using any of the methods as described above. Downhole depth measurements may be checked and updated with the assistance of a surface based depth measurement.

Reference values of the same borehole characteristics are also provided. In step 184, the reference values are provided, based on a model of the borehole. As described above, the reference values are based on a model of the borehole, based on surface measurements, modellation of the borehole based on tests, etc.

In step 186, the scheme checkes whether a target depth TD has been reached. If yes, the scheme ends in step 188.

If TD has not been reached, the scheme calculates a deviation between the measured values and the reference values of the planned trajectory in step 190.

In a subsequent step 192, the scheme calculates a required build rate. Build rate herein indicates an increase of inclination, i.e. change of angle $\alpha$. Build rate may typically be expressed in angle per unit of distance (for instance 1°/100 ft or 1°/30 m).

Tests were performed to compare the performance of the real time downhole drilling automation system with a surface based automated drilling system for execution of a planned borehole trajectory. The surface based system relies on mud pulse telemetry for communication and the number of changes possible in the settings per added section of drill pipe is limited. The downhole based system can make much more frequent changes in tool settings. The downhole system can achieve a real time closed loop control.

In practice, the downhole system can make frequent changes in settings, for instance when less than 2 m has been drilled. The downhole system may for instance make changes to the setting every 0.1 m. The surface based system can make changes only after at least 2.5 m has been drilled.

The tests indicated that, due to high tortuosity of the planned trajectory, both the real time downhole control and the surface based discrete control deviate from the planned trajectory. The deviation from the planned trajectory along the depth in east ($\Delta E$), north ($\Delta N$) and vertical ($\Delta TVD$) were checked. The error in north direction for the downhole system (0.11%) was significantly smaller than the error for the surface based system (2.4%). For the east direction, the error of the surface based system and the downhole system were of the same order of magnitude (0.5 to 0.9%).

The tests also establishes the integrability of downhole depth measurements with control for automated drilling.

The following conclusions are drawn based on the tests for estimating depth downhole.

1. Correlation of subsurface measurements can be used for estimating downhole depth;

2. Gamma ray and density measurements can be successfully used for correlation;

3. Both cross-correlation and hybrid pattern matching algorithms perform sufficiently well for low noise levels;

4. By optimising on pattern size, the performance of the algorithm can be improved in terms of accuracy and computational efficiency;

5. The cross-correlation based method is robust against drift in sensor;

6. ROP variation is a key source of error in correlation of subsurface measurements. This error can be minimised by, for instance: Minimising ROP variation and/or minimizing the separation L between the source 120 and the detector 124;

7. For a depth measurement system including two gamma ray sensors S1 and S2 (FIG. 4A), the error in incremental depth may increase in a horizontal section of the borehole, which typically shows less variation in gamma ray radiation as the borehole extends within the same formation layer;

8. The error decreases with increase in number of counts associated with each data point;

9. The overall error can be reduced with help of a secondary system, such as a nuclear marker-detector system;

10. The signal strength of a nuclear marker depends on the subsurface composition. It can be optimized by pre-selecting one or more target atoms, which may be relatively abundant in a certain formation layer. The detector may then be optimized for gamma decay of the target atoms;

11. The error associated with the nuclear marker-detector system is independent of ROP variations;

12. Integration of downhole depth with RSS control can realise downhole automated well-plan execution;

13. The detector 124 is preferably a gamma ray sensor being optimised for gathering higher count rates.

As described above, the present invention proposes to use a system of manmade nuclear markers in to formation as a secondary depth measurement system. The dependency of such system on geological features and properties is low, rendering the system suitable for the entire borehole, including inclined and horizontal sections thereof. The measurement resolution can be selected based on the specific application. The present invention uses available tools to provide a robust marking system and to obviate hardware development. Accuracy of the marker system can be selected, depending on the precision and/or sensitivity of the detector.

A suitable gamma ray detector is available on the market. Gamma ray detectors are for instance often comprised in a LWD system due to its low cost, reliability and ability to identify different geological layers based on their radioactivity.

Gamma ray emissions occur for instance during radioactive decay of unstable isotopes. Macroscopic observations of radioactive decay involve counting the number of decay emissions from millions of unstable nuclides over a finite length of time. Because of the large number of events, i.e. radioactive decay emissions, and the small probability for a given unstable nucleus to decay (depending on half-life), radioactive count rates can be modeled by either Poisson or Gaussian probability distributions. For either of these probability distributions, the distribution standard deviation is equal to the square root of the estimate. If the total count of gamma rays is x, then the standard deviation $\sigma_x = \sqrt{x}$ and the relative total count standard deviation is $$\sigma_{rel} = \frac{1}{\sqrt{x}}.$$

I.e., if the total count x increases, than the relative error decreases. Hence, the tool and data acquisition scheme of the invention are preferably designed to provide a high total count pertaining to each data point in the signal. The latter will improve repeatability of the signal.

Some of possibilities to improve total count x include increase of the size of the crystal, reduction in attenuation due to reduction in the thickness of a protective collar enclosing the detector, and/or increasing the time window for each measurement.

The nuclear source may comprise a deuterium-deuterium or deuterium-tritium fusion based electronically operated pulsed neutron source. The nuclear source may operate in environments up to 150° C. and 20,000 psi (about 1400 bars). The nuclear source is a relatively compact device using deuterium-deuterium and/or deuterium-tritium reactions. The reactions may generate neutrons of energy in the order of about 2.5 MeV and 14.1 MeV respectively. Corresponding reactions are shown below.

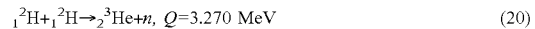

$$_1^2H + _1^2H \rightarrow _2^3He + n, \quad Q = 3.270 \text{ MeV} \tag{20}$$

$$_1^2H + _1^3H \rightarrow _2^4He + n, \quad Q = 17.590 \text{ MeV} \tag{21}$$

In the reaction of formula (20), the Helium atom has an energy of about 0.82 MeV, and the neutron has an energy in the order of 2.45 MeV. In the reaction of formula (21), the Helium atom has an energy of about 3.5 MeV, and the neutron has an energy in the order of 14.1 MeV. Other fusion reactions are also possible.

The basic construction of the device consist of a source to generate positively charged ions, an ion accelerator (for instance up to 110 kV) and a metal hydride target loaded with either deuterium, tritium or a mixture of the two.

Figure 14:
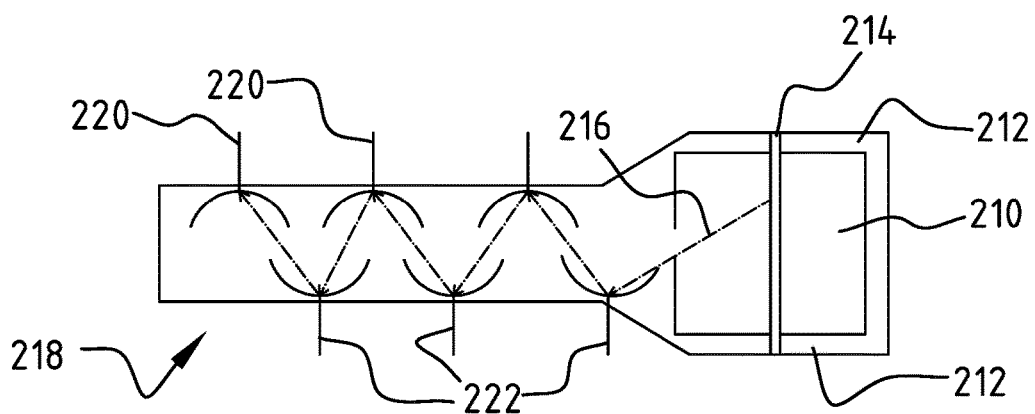

The gamma ray detector 124 may comprise a scintillator based gamma ray detector, as used for well logging (see FIG. 14). The detector 124 may use a scintillator crystal 210 which on interaction with gamma ray photons generates light. The crystal may be provided with a protective cover 212. A photo cathode 214 may engage the crystal 210 for the conversion of gamma rays to visible photons. Small amounts of impurities (called activators) are added to the scintillator crystal to enhance the emission of visible photons. One important consequence of luminescence through activator impurities is that the bulk scintillator crystal 210 is transparent to the scintillation light.

On entering the crystal 210, the gamma rays may produce fast electrons by three different processes: 1) A photo electric effect; 2) Compton effect; and 3) pair production (Photon energy >1.02 MeV). These fast electrons create scintillations and produce light photons 216. The light photons then pass through a photomultiplier tube 218 which scales up the signal to be finally detected in the form of an electric pulse, i.e. an electric potential between one or more anodes 220 and one or more dynodes 222. The pulse height quantifies the incident gamma ray energy.

The count of the electric pulses quantifies the amount of gamma ray photons reacting with the crystal 210. Since the gamma ray energy is usually very high compared to a binding energy of an electron, when a gamma ray loses its energy due to the photoelectric effect, almost all the energy associated with it gets transferred to the electron and those electrons create a photo peak in the spectrum. On the other hand, the spectrum related to Compton scattering is almost a flat plateau as the energy distribution of Compton scattered electrons is constant with energies ranging from 0 to maximum energy loss called Compton edge.

A wide variety of organic and inorganic crystals and liquids can be used as a scintillator, such as BGO (Bismuth Germanate), LaCl3(Ce) (Lanthanum chloride doped with Cerium), Polyethylene naphthalate, etc. A thallium doped sodium iodide crystal [NaI(Ti)] is a good choice for the crystal of the detector due to its higher light yield.

To improve the detection efficiency, the crystal 210 may have an annular design (FIG. 10A). An outer diameter $r_o$ may be about 8 cm, inner diameter $r_i$ may be about 6.5 cm, and height H may be about 5 cm or more. To increase accuracy and/or detector sensitivity, the outer diameter and/or the height of the detector crystal may be increased, depending on available space in the tool string 4 or BHA 12.

Detector counting efficiency η can be defined as the ratio of number of photons counted in the detector $n_d$ to the number of photons emitted by the source $n_s$. Detector counting efficiency may be optimized, depending on one or more of the following factors:
i) Crystal geometry;
ii) shielding of the crystal by cover 212;
iii) Optical efficiency of the crystal, which quantifies the photons which can manage to transmit through the crystal out of the total produced photons;
iv) Quantum efficiency of the photo cathode. This is the ratio of the number of photoelectrons emitted to the number of incident gamma ray photons;
v) Dynode multiplication factor. This is the ratio of number of secondary electrons emitted to the primary incident electrons 216. The emission of secondary electrons is a statistical process, so the multiplication factor is not a constant but varies from event to event around a mean value;
vi) Efficiency of anode collection. This is the ratio of number of electrons 216 received at the anode to the total electrons generated at the last dynode 222.

Among numerous elements present in the formation, in a preferred embodiment the marker system of the invention may target some elements in particular, based on their abundance and/or half life. Herein below nuclear properties of three isotopes are provided which may be targeted according to the nuclear marker system of the invention.

Chlorine-37. Chlorine is often comprised in formation water, which is bound in pores of the formation. The chlorine is solved in the water as chlorine ions. It has a 33 barn thermal capture cross-section and may produce many intense gamma rays between 1.5 to 8.6 MeV on decay. Cl-37 is a naturally occurring isotope of chlorine with abundance of 24.2% in naturally occurring chlorine. The Cl-37 can be converted to Cl-38 or Cl-39 (isotopes of chlorine) by neutron capture. For Cl-37 the neutron capture cross section area may be in the order of 0.433 barn.

The characteristic energies of gamma rays related to the decay of chlorine-38 are 1.6 MeV and 2.1 MeV. The half life of Cl-38 is about 37.24 min. A time window to detect the gamma rays produced from the decay is preferably set within 0 to about 37.2 minutes (time for 50% depletion). Corresponding reactions are summarized below.

$$_0^1n + _{17}^{37}Cl \rightarrow _{17}^{38}Cl + \gamma \tag{22}$$

$$_{17}^{38}Cl \rightarrow _{18}^{38}Ar + _0^{-1}\beta; \quad Q=4.917 \text{ MeV} \tag{23}$$

Sodium is usually also present in the saline formation water bound in pores of the formation, along with chlorine. Sodium-23 has a nuclear capture cross section of about 0.530 barn. Upon neutron capture, Na-23 typically converts into Na-24, which has a half life of about 14.96 hr. The characteristic gamma rays related to beta decay of Na-24 have energies of about 1.369 and 2.754 MeV. The corresponding reactions are $$_0^1n + _{11}^{23}Na \rightarrow _{11}^{24}Na + \gamma \tag{24}$$

$$_{11}^{24}Na \rightarrow _{12}^{24}Mg + _0^{-1}\beta; \quad Q=5.513 \text{ MeV} \tag{25}$$

Silicon is one of the most abundant elements in the earth. Natural silicon contains Si-28 (about 92.23%), Si-29 (about 4.67%) and Si-30 (about 3.1%). Herein, Si-30 may be of interest for neutron activation. Silicon-30 has a neutron capture cross-section of about 0.11 barn and can be converted to Si-31, which has a half-life of about 157.3 min. The energy of the characteristic gamma rays from the decay is about 1.266 MeV.

$$_0^1n + _{14}^{30}Si \rightarrow _{14}^{31}Si + \gamma \tag{26}$$

$$_{14}^{31}Si \rightarrow _{15}^{31}P + _0^{-1}\beta \quad Q=1.492 \text{ MeV} \tag{27}$$

Radioactive isotopes typically follow an exponential decay. The decay time of nuclei is governed by a decay constant. At any time t from activation, the ratio of remaining active nuclei N at time t with respect to the originally activated nuclei $N_0$ at time $t_0$ is given by $$\frac{N}{N_o} = e^{-\lambda t} \tag{28}$$

and $$\lambda = \frac{\ln 2}{T_{1/2}} \tag{29}$$

wherein λ is the activity constant for the decay reaction ($s^{-1}$), and $T_{1/2}$ is the half-life of radioactive nuclide.

In a preferred embodiment, a time window for detection is limited to about the half-life of the targeted nuclide. The time window is determined by the distance L in conjunction with the rate of penetration. The latter depends on various aspects, but may typically fall within a range of about 5 to 10 m/hr (about 15 to 35 ft/hr). Taking into account the half-lifetimes of the target substances as provided above, the distance L between the source 120 and the detector 124 may be selected within a range between (almost) 0 and a maximum Lmax of:

| Target | Half-life | Lmax (m) |
| --- | --- | --- |
| Na-23 | 15 hr. | 75 to 150 |
| CL-37 | 37 min. | 3 to 6 |
| Si-30 | 2.5 hr | 12.5 to 25 |

In the table above, exemplary values of Lmax are provided. Herein, Lmax is calculated based on the expected ROP: Lmax=(Half-lifetime of activated target substance)* (Expected average ROP). The value of L may be selected between 0 (very close to the source) and Lmax, also taking into account the required accuracy.

In an embodiment, the system of the invention may comprise multiple detectors D1, D2, etc., each located at a corresponding axial distance L1, L2, etc. with respect to the source. Preferably, each of L1, L2, etc. is equal to or less than Lmax, as provided in the table above. Incremental depth may be calculated based on multiples of said distance L1, L2, etc., respectively. Depth values calculated using the signal of respective detectors may be compared and averaged, to further improve accuracy.

The present invention is not limited to the embodiments described above, wherein various modifications are conceivable within the scope of the appended claims. Features of respective embodiments may for instance be combined.

The invention claimed is:
1. A system for making downhole measurements in an underground borehole, the system comprising:
a neutron source for transmitting a neutron pulse to activate a target substance in an underground formation surrounding the borehole;

a nuclear radiation detector located at an axial distance L from the neutron source for detecting nuclear radiation emitted by the activated target substance; and a downhole drilling progress monitoring unit configured to calculate incremental depth of a drilling assembly in the borehole based on detection of the nuclear radiation and the axial distance L.

2. The system of claim 1, wherein the downhole drilling progress monitoring unit is arranged in a Bottom Hole Assembly (BHA) of the drilling assembly and is configured to provide real time data regarding the incremental depth, an associated Rate Of Penetration (ROP), azimuth and/or inclination of the BHA to an automated downhole drill bit navigation system.

3. The system of claim 2, wherein the automated downhole drill bit navigation system is arranged in the BHA and the downhole drilling progress monitoring unit is configured to transmit the real time data to the automated drill bit navigation system via a signal transmission assembly in the BHA without requiring transmission of the real time data to data processing equipment located at the earth surface.

4. The system of claim 3, wherein the automated drill bit navigation system comprises means for navigating the BHA towards a subsurface drilling target based on data stored in the system regarding:

three-dimensional geographic coordinates of a wellhead of the borehole and of the subsurface drilling target; and an estimate of the borehole trajectory based on the real time data collected by the drilling progress monitoring unit regarding the incremental depth, azimuth and inclination of the BHA throughout the length of the borehole trajectory.

5. The system of claim 1, wherein the a detector is cylindrical.

6. The system of claim 1, wherein the detector has a height of at least 5 cm and/or is configured to detect nuclear radiation emitted by a target substance comprising Chlorine-37, Sodium-23 and/or Silicon-30.

7. The system of claim 1, comprising at least two detectors, arranged at predetermined axial distances $L_1$ and $L_2$ from the neutron source.

8. The system of any of or any combination of the previous claims, wherein each axial distance L, $L_1$ and $L_2$ is equal to or smaller than a maximum value $L_{max}$.

9. The system of claim 8, wherein each axial distance L, $L_1$ and $L_2$ is at least 20 cm and larger than a spread of activated nuclei of the target substance along the axis of the borehole and/or $L_{max}$ is between 3 and 6 meters.

10. A method of making downhole measurements in an underground borehole, the method comprising the steps of:

transmitting a neutron pulse by a neutron source to activate a target substance in an underground formation surrounding the borehole; and inducing a nuclear radiation detector located at an axial distance L from the neutron source to detect nuclear radiation emitted by the activated target substance; and inducing a downhole drilling progress monitoring unit to calculate incremental depth of a drilling assembly in the borehole based on detection of the nuclear radiation and the axial distance L.

11. The method of claim 10, wherein the nuclear radiation comprises gamma rays and/or the detector detects nuclear radiation emitted by a target substance comprising Chlorine-37, Sodium-23 and/or Silicon-30.

12. The method of claim 10, wherein the downhole drilling progress monitoring unit is arranged in a Bottom Hole Assembly (BHA) of a drilling assembly and provides real time information about the incremental depth, an associated Rate Of Penetration (ROP), azimuth and/or inclination of the BHA to an automated downhole drill bit navigation system.

13. The method of claim 12, wherein the automated drill bit navigation system is arranged in the BHA and transmits the real time data to the automated drill bit navigation system via a signal transmission assembly in the BHA without requiring transmission of the real time data to data processing equipment located at the earth surface.

14. The method of claim 13, wherein the automated drill bit navigation system comprises means for navigating the BHA towards a subsurface drilling target based on data stored in the system regarding:

three-dimensional geographic coordinates of a wellhead of the borehole and of the subsurface drilling target; and an estimate of the borehole trajectory based on the real time data collected by the drilling progress monitoring unit regarding the incremental depth, azimuth and inclination of the BHA throughout the length of the borehole trajectory.

15. The method of claim 14, wherein the automated drilling process is terminated when the BHA has reached the subsurface target, whereupon the drilling assembly is removed from the borehole, the borehole is completed and configured as a hydrocarbon fluid production well and hydrocarbon fluid is produced from the well.

* * * * *